(12) United States Patent
Herter et al.

(10) Patent No.: US 10,982,575 B2
(45) Date of Patent: Apr. 20, 2021

(54) EJECTOR DEVICE AND COMBINATION OF A CYLINDER HEAD COVER AND AN EJECTOR DEVICE

(71) Applicant: ElringKlinger AG, Dettingen (DE)

(72) Inventors: Stefan Herter, Zwiefalten (DE); Martin Jaeger, Dusslingen (DE); Armin Ehni, Lenningen (DE); Stefan Dwenger, Reutlingen (DE); Yvonne Huber, Stuttgart (DE)

(73) Assignee: ElringKlinger AG, Dettingen (DE)

( * ) Notice: Subject to any disclaimer, the term of this patent is extended or adjusted under 35 U.S.C. 154(b) by 0 days.

(21) Appl. No.: 16/163,859

(22) Filed: Oct. 18, 2018

(65) Prior Publication Data
US 2019/0048768 A1 Feb. 14, 2019

Related U.S. Application Data

(63) Continuation of application No. PCT/EP2017/058710, filed on Apr. 11, 2017.

(30) Foreign Application Priority Data

Apr. 19, 2016 (DE) .......................... 102016206616.1

(51) Int. Cl.
*F01M 13/02* (2006.01)
*F04F 5/44* (2006.01)
(Continued)

(52) U.S. Cl.
CPC ............. *F01M 13/021* (2013.01); *F04F 5/16* (2013.01); *F04F 5/24* (2013.01); *F04F 5/44* (2013.01);
(Continued)

(58) Field of Classification Search
CPC ............ F01M 13/021; F01M 2013/026; F16L 37/133; F16L 37/098; F04F 5/463;
(Continued)

(56) References Cited

U.S. PATENT DOCUMENTS 2,382,391 A  8/1945 Berman
3,208,399 A * 9/1965 Keller .................... F04F 5/464
                                                        417/151
(Continued)

FOREIGN PATENT DOCUMENTS

CN   2 434 462   6/2001
DE   44 00 958   4/1995
(Continued)

*Primary Examiner* — Nathan C Zollinger
(74) *Attorney, Agent, or Firm* — Womble Bond Dickinson (US) LLP

(57) ABSTRACT

An ejector device having a base body that includes a suction chamber for sucking in a suction medium, a mixing channel for mixing a propelling medium with the suction medium, and a drive nozzle device for generating and directing a propelling medium jet along a jet direction from the suction chamber and into the mixing channel. The ejector device also includes a fastening device for fastening the base body of the ejector device to a suction channel. The fastening device also includes at least one of a translational locking device for avoiding a translational movement of the base body relative to the suction channel in a direction running parallel to a center axis of a connecting piece of the suction channel and a rotational locking device for preventing the base body from rotating relative to the suction channel.

15 Claims, 15 Drawing Sheets

(51) Int. Cl.
*F04F 5/46* (2006.01)
*F04F 5/24* (2006.01)
*F04F 5/16* (2006.01)
*F16L 37/098* (2006.01)
*F16L 37/133* (2006.01)
*F04F 5/20* (2006.01)

(52) U.S. Cl.
CPC .............. *F04F 5/46* (2013.01); *F16L 37/098* (2013.01); *F16L 37/133* (2013.01); *F01M 2013/026* (2013.01); *F04F 5/20* (2013.01); *F04F 5/463* (2013.01)

(58) Field of Classification Search
CPC ........ F04F 5/20; F04F 5/46; F04F 5/44; F04F 5/24; F04F 5/16
See application file for complete search history.

(56) References Cited

U.S. PATENT DOCUMENTS

| | | | |
|---|---|---|---|
| 3,239,131 A * | 3/1966 | Whyte | F04F 5/54 417/87 |
| 5,611,673 A | 5/1997 | Agata | |
| 6,270,321 B1 * | 8/2001 | Schulte | B60T 17/02 417/182 |
| 6,296,454 B1 * | 10/2001 | Schmid | F04F 5/463 417/151 |
| 6,619,927 B1 | 9/2003 | Becker et al. | |
| 7,182,869 B2 | 2/2007 | Catlin et al. | |
| 8,096,780 B2 * | 1/2012 | Tipton | B60K 15/077 123/509 |
| 8,105,050 B2 | 1/2012 | Yamada | |
| 10,072,674 B2 | 9/2018 | Völker et al. | |
| 10,550,743 B2 * | 2/2020 | Coolens | F01M 13/0416 |
| 2002/0172601 A1 | 11/2002 | Lienig | |
| 2004/0101416 A1 * | 5/2004 | Eck | B29C 45/1711 417/151 |
| 2006/0076287 A1 * | 4/2006 | Catlin | B01D 35/0273 210/416.4 |
| 2007/0017011 A1 * | 1/2007 | Futch | C02F 1/686 4/226.1 |
| 2011/0209772 A1 | 9/2011 | Woiken et al. | |
| 2012/0318215 A1 * | 12/2012 | Copley | B01D 45/08 123/41.86 |
| 2015/0240732 A1 | 8/2015 | Makihara | |
| 2015/0292524 A1 * | 10/2015 | Beg | F04F 5/463 417/151 |

FOREIGN PATENT DOCUMENTS

| | | | |
|---|---|---|---|
| DE | 195 30 423 | 2/1997 | |
| DE | 196 31 010 | 2/1998 | |
| DE | 10 2015 203 337 | 8/2016 | |
| EP | 1903209 A1 * | 3/2008 | ........... F02M 55/002 |
| GB | 1109232 | 4/1968 | |
| GB | 1145896 A * | 3/1969 | ........... F16L 37/098 |
| JP | H 10-184598 | 7/1998 | |
| WO | WO 2011/095790 | 8/2011 | |
| WO | WO 2013/017832 | 2/2013 | |
| WO | WO 2013/021456 | 2/2013 | |
| WO | WO 2014/060831 | 4/2014 | |
| WO | WO 2014/155054 | 10/2014 | |

* cited by examiner

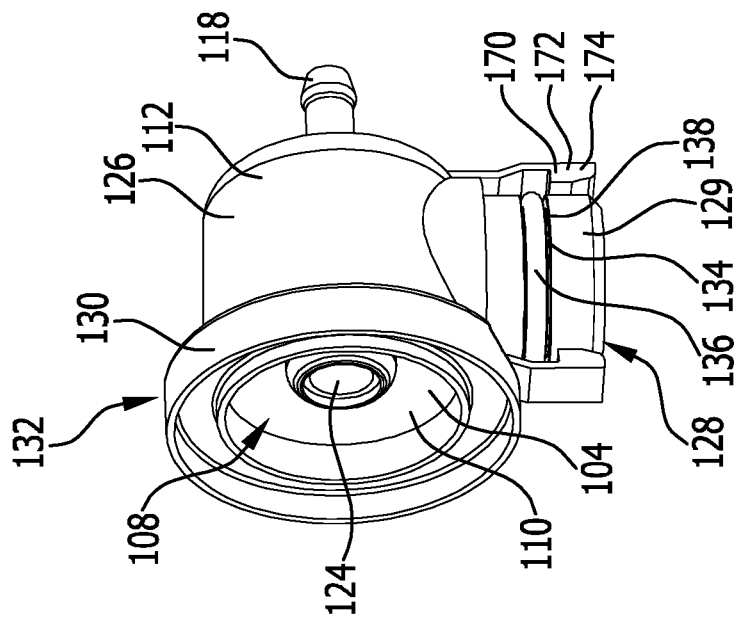
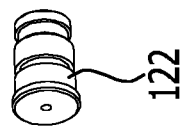
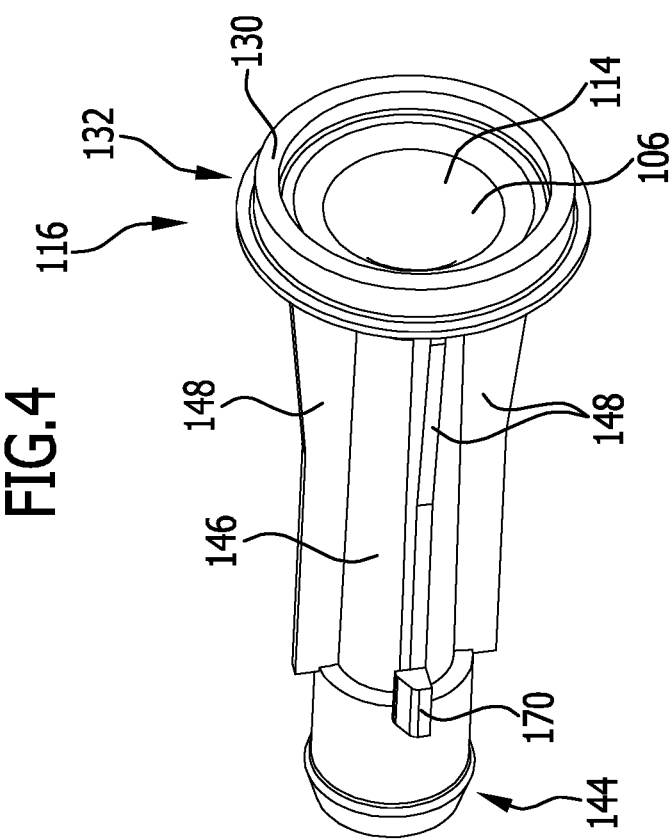

EJECTOR DEVICE AND COMBINATION OF A CYLINDER HEAD COVER AND AN EJECTOR DEVICE

RELATED APPLICATION

This application is a continuation of international application No. PCT/EP2017/058710 filed on Apr. 11, 2017, and claims the benefit of German application No. 10 2016 206 616.1 filed on Apr. 19, 2016, which are incorporated herein by reference in their entirety and for all purposes.

FIELD OF DISCLOSURE

The present disclosure relates to an ejector device. The ejector device may, in particular, be a jet pump for creating a vacuum and for sucking in or sucking out a suction medium.

BACKGROUND

Ejectors are known from WO 2011/095790 A1 or WO 2013/017832 A1, for example.

SUMMARY

The problem addressed by the present disclosure is that of providing an ejector device with a simple design that is economical to produce and can be fitted with little effort.

This problem is solved by an ejector device according to claim 1.

The ejector device according to the disclosure comprises a base body which may comprise the following:
  a suction chamber for sucking in a suction medium;
  a mixing channel for mixing a propelling medium with the suction medium;
  a drive nozzle device for generating and directing a propelling medium jet out of the suction chamber along a jet direction and into the mixing channel.

The ejector device according to an embodiment of the disclosure is, in particular, a jet pump for creating a vacuum.

A vacuum for sucking in and/or sucking out a suction medium can, in particular, be created by the ejector device according to embodiments of the present disclosure.

In the following the sucking-in and/or sucking-out functions are simply referred to as "suction".

The ejector device may, in particular, be used for sucking in gas containing oil mist.

In this case, the ejector device is, in particular, a component part of an oil separation device which is used, in particular, in a vehicle with an internal combustion engine.

The base body of the ejector device preferably comprises a suction chamber element surrounding the suction chamber.

In particular, the suction chamber is configured as an interior of the suction chamber element or is formed by the interior of the suction chamber element.

The suction chamber element preferably comprises a substantially toroidal interior.

The suction chamber is preferably substantially toroidal in design.

It may be provided that the base body comprises a mixing channel element as an alternative or in addition to the suction chamber element.

The mixing channel element preferably surrounds the mixing channel.

In particular, the mixing channel is formed by an interior of the mixing channel element or is configured as an interior of the mixing channel element.

It may be favorable for the suction chamber element and the mixing channel element to be components that differ from one another.

The suction chamber element and the mixing channel element are preferably components that differ from one another and are connected to one another following the individual production process in each case, in particular plastic injection-molded components.

Both the suction chamber element and the mixing channel element are preferably produced as one piece in a single production step as a plastic injection-molded component.

The suction chamber element and the mixing channel element are preferably connected to one another in a flange region. In particular, it may be provided that the suction chamber element and the mixing channel element are connected to one another by means of a welded connection, a screw connection, a clamping connection and/or a latching connection.

The suction chamber element and the mixing channel element are preferably connected to one another in a gas-tight manner in the flange region.

The suction chamber element and the mixing channel element are preferably connected to one another in such a manner that the suction chamber and the mixing channel are directly adjacent to one another and are fluidically connected.

It may be provided that the mixing channel, in particular a mixing channel element of the base body, comprises the following:
  a tapering portion that is connected to the suction chamber along the jet direction and which has an inner cross-sectional area that decreases continuously and/or constantly along the jet direction and/or a widening portion that adjoins the tapering portion along the jet direction and has an inner cross-sectional area that increases continuously and/or constantly along the jet direction.

The tapering portion is preferably directly attached to the suction chamber.

The widening portion may be directly attached to the tapering portion.

As an alternative to this, however, it may also be provided that an intermediate portion is provided between the tapering portion and the widening portion, which intermediate portion has an inner cross-sectional area that is unchanged along the jet direction.

An inner cross-sectional area is, in particular, an area through which a flow can pass in a plane running perpendicular to the jet direction.

The mixing channel comprises, in particular, a convergent portion which is formed by the tapering portion and a divergent portion which is formed by the widening portion.

A de Laval nozzle is preferably formed by means of the mixing channel.

The mixing channel element is, in particular, a de Laval nozzle element.

It may be provided that a suction chamber element of the base body comprises one or more or all of the following components:
  a housing for the suction chamber;
  a suction channel connection;
  a propelling medium connection;
  a drive nozzle element receiving means;

a propelling medium channel for the fluidic connection of the propelling medium connection to the drive nozzle element receiving means;

a flange portion for connecting the suction chamber element to a mixing channel element of the base body that differs therefrom;

one or more locking elements of a translational locking device of a fastening device for fastening the base body to a suction channel;

one or more locking elements of a rotational locking device of a fastening device for fastening the base body to a suction channel;

a positioning device for positioning the suction chamber element relative to a translational locking device and/or relative to a rotational locking device.

The suction chamber preferably surrounds the drive nozzle element receiving means, a drive nozzle element arranged therein and/or a propelling medium channel in a substantially annular, in particular toroidal, or annular segment-shaped, in particular toroidal, manner.

In one embodiment of the disclosure, it may be provided that a mixing channel element of the base body comprises one or more or all of the following components:

a housing for the mixing channel;

a discharge connection;

a flange portion for connecting the mixing channel element to a suction chamber element of the base body that differs therefrom;

one or more locking elements of a translational locking device of a fastening device for fastening the base body to a suction channel;

one or more locking elements of a rotational locking device of a fastening device for fastening the base body to a suction channel;

a positioning device for positioning the mixing channel element relative to a translational locking device and/or relative to a rotational locking device.

A positioning device is, in particular, a combination of one or more projections and/or one or multiple depressions for restricting the movement of the base body relative to the suction channel.

In particular, a positioning device may be used to fix the base body, for example the suction chamber element and/or the mixing channel element, in one or two or three spatial directions or degrees of freedom of movement, in order to facilitate and/or supplement complete fixing in all degrees of freedom by means of the locking device.

A mixing channel element of the base body may, in particular, comprise one or more stiffening ribs.

One stiffening rib or multiple stiffening ribs is/are preferably an integral part of a positioning device.

In particular, one or multiple projections of the positioning device can be used in order to prevent unwanted twisting, tilting, displacement, etc. of the mixing channel element by one or multiple stiffening ribs of the mixing channel element being held in a desired position by means of the one or multiple projections.

It may be favorable for a suction chamber element of the base body to be a standard component for receiving drive nozzle elements of a different kind and/or size.

The suction chamber element of the base body may, in addition, be a standard component for connecting to mixing channel elements of a different kind and/or size.

A standard component is, in particular, a universal non-variable part which can be used for a plurality of possible applications, in particular for producing ejector devices of different dimensions and/or operating parameters.

A drive nozzle element of a drive nozzle device is preferably integrated in the suction chamber element.

It may be provided, for example, that a drive nozzle element of the drive nozzle device is guided through the suction chamber.

The suction chamber element is preferably used as a base element for the entire ejector device, to which all other components that are functionally relevant to the operating properties are fixed.

The suction chamber element preferably simultaneously provides a connection possibility for the supply of the propelling medium and/or a connection possibility for the suction medium.

By using a suction chamber element designed as a standard component, a cost-effective standard component can be produced in greater unit numbers, in particular while minimizing set-up times and set-up costs of the production tool.

A suction chamber element and/or a mixing channel element of the base body are preferably configured as plastic injection-molded components and preferably have a main demolding direction which is substantially parallel to the jet direction.

In an embodiment of the disclosure, it may be provided that the ejector device comprises a fastening device for fastening the base body of the ejector device to a suction channel.

The fastening device preferably comprises a translational locking device for avoiding a translational movement of the base body relative to the suction channel, in particular in a direction running parallel to a center axis of a connecting piece of the suction channel.

The center axis is, in particular, oriented transversely, for example substantially perpendicular to the jet direction. The base body then has, in particular, an angled configuration.

It may also be provided, however, that the center axis and the jet direction are oriented substantially parallel to one another.

The propelling medium supplied is then deflected, in particular within the suction chamber element.

The connecting piece of the suction channel is, in particular, an end portion of the suction channel, to which the ejector device is directly fixed or is fixable.

In particular, an immediate, direct and/or contacting connection between a suction channel connection of a suction chamber element of the base body and the connecting piece of the suction channel can be created, in order to fix the base body of the ejector device to the suction channel.

Alternatively or in addition to a translational locking device, the fastening device may have a rotational locking device. A rotational locking device of this kind is used, in particular, to prevent rotation of the base body relative to the suction channel.

In particular, a rotation of the base body of the ejector device about a center axis of a connecting piece of the suction channel is avoidable by means of the rotational locking device.

It may be favorable for the ejector device to comprise a fastening device for fastening the base body of the ejector device to a suction channel, wherein the fastening device comprises a translational locking device and a rotational locking device.

The translational locking device and the rotational locking device are preferably a) different from one another, b) spatially separate from one another, c) functionally separate from one another, d) actuable independently of one another and/or e) actuable consecutively.

The term "locking devices that are different from one another" should be understood to mean, in particular, that the translational locking device and the rotational locking device are formed by components or component portions that differ from one another.

The term "locking devices that are spatially separate from one another" should be understood to mean, in particular, that the translational locking device and the rotational locking device act on spatial regions and/or portions of the ejector device that are different from one another, in order to bring about the translational locking or rotational locking.

The term "locking devices that are functionally separate from one another" should be understood to mean, in particular, that the translational locking device and the rotational locking device are formed by elements that are functionally independent of one another.

The term "locking devices that are actuable independently of one another" should be understood to mean, in particular, that the translational locking device can either be moved into a release state or a locking state independently of a state of the rotational locking device or that the rotational locking device can either be moved into a release state or a locking state independently of a state of the translational locking device.

As an alternative to this, it may be provided that the translational locking device can only be moved into either the release position or the locking position if the rotational locking device is arranged either in the release position or in the locking position.

In addition, it may be provided that the rotational locking device can only be moved into either the release position or the locking position if the translational locking device is either in the release position or in the locking position.

The term "locking devices that are actuable consecutively" should be understood to mean that the translational locking device and the rotational locking device cannot be moved simultaneously from a release position into a locking position or from the locking position into the release position.

As an alternative to this, however, it may be provided that the translational locking device and the rotational locking device can be moved simultaneously from the release position into the locking position or from the locking position into the release position.

It may be advantageous for the translational locking device and/or the rotational locking device each to comprise one or multiple locking elements, in particular latching elements and/or latching receiving means.

The translational locking device and/or the rotational locking device are, in particular, formed by one or more latching devices. A latching mechanism facilitates tool-free assembly, in particular, without additional implements such as screws, for example.

One or more locking elements of the translational locking device and/or the rotational locking device are preferably configured as projections, in particular latching hooks.

The projections, in particular the latching hooks, are particularly arranged and/or configured on a suction chamber element of the base body.

In particular, the projections, in particular the latching hooks, are formed integrally with the suction chamber element and/or molded onto the same.

Rather having than multiple projections, in particular multiple latching hooks, it may also be provided that the translational and/or rotational locking device only comprises a single projection, in particular only a single latching hook.

A latching hook may, in particular, be a snap hook or similar.

One or a plurality of locking elements of the translational locking device and/or of the rotational locking device is/are preferably configured as projections, in particular as latching hooks, and arranged on a mixing channel element of the base body, in particular configured integrally therewith or molded onto the same.

It may be provided that a locking element of the translational locking device is configured as an annular bead or thickening, in particular as a latching ring, on an outside of a connecting piece of the suction channel.

In particular, an annular bead or thickening of this kind can be gripped behind by means of one or multiple latching hooks, in order to achieve a translational lock. Due to the annular configuration of the bead or thickening, a rotational movement (rotation) may still be possible despite the translational locking.

As an alternative to a fixing of locking elements configured as projections, in particular as latching hooks, on a locking element configured as an annular bead or thickening, the fixing may be provided on or in one or multiple depressions. The one or multiple depressions then likewise form, in particular, locking elements, in particular locking elements of the translational locking device and/or of the rotational locking device.

In particular, pairs of locking elements, for example a latching hook and a depression in each case, are provided in order to achieve the locking action.

The positions of the locking elements described in the present description and the attached claims and depicted in the attached drawings may be selected at random, in particular the locking elements configured as projections, for example as latching hooks, may be replaced by locking elements configured as depressions or an annular bead or thickening if, in turn, the locking elements configured as depressions or as an annular bead or thickening are replaced by projections, in particular latching hooks.

Consequently, it may be of little or no consequence whether locking elements of the base body configured as projections, for example, engage with corresponding depressions in the suction channel or, however, locking elements of the suction channel configured as projections engage with corresponding depressions in the base body.

In an embodiment of the disclosure it may be provided that one or multiple locking elements of the translational locking device and/or the rotational locking device are configured as depressions in a connecting piece of the suction channel.

The one or multiple depressions are, in particular, arranged behind a locking element of the translational locking device configured as an annular bead or thickening.

Locking elements configured as projections, in particular as latching hooks, which are arranged on the base body of the ejector device may then engage behind the locking element configured as a bead or thickening, for example, in order to bring about the translational locking. Through subsequent rotation of the base body relative to the suction channel, the projections, in particular the latching hooks, can then be guided into the depressions in the connecting piece, in order finally to bring about the rotational locking.

It may be favorable for one or multiple locking elements of the translational locking device and/or the rotational locking device to be arranged on a half of the mixing channel element facing away from the suction chamber, in particular on an end region of the mixing channel element facing away from the suction chamber. In this way, a greater lever effect can, in particular, be used to fix the base body in a stable manner due to the point of application of the locking elements spaced apart from the center axis of the connecting piece.

In an embodiment of the disclosure, it may be provided that the ejector device comprises a fastening device by means of which the base body can initially be slipped onto a connecting piece of a suction channel through a translational movement along a translational direction and by means of which the base body can then be rotated about a center axis of the connecting piece and can thereby be fixed in a rotational orientation relative to the connecting piece.

In this way, a rotational orientation of the base body during the slipping of the same onto the connecting piece can, in particular, be freely selected over a wide range. This may simplify the assembly of the ejector device.

The translational direction is, in particular, a direction running parallel to the center axis of the connecting piece.

It may be provided that the connecting piece and/or a suction channel connection of the suction chamber element comprises a sealing element receiving means for receiving a sealing element, in particular an O-ring. The sealing element receiving means may, in particular, be formed by an annular groove.

A reliable seal in the transitional region between the suction channel and the base body of the ejector device can, in particular, be guaranteed by means of a sealing element received in the sealing element receiving means.

Particularly when the ejector device is to be capable of being produced particularly easily and cost-effectively, multiple components of the ejector device are preferably formed from a plastics material.

A drive nozzle element of the drive nozzle device is preferably also made from a plastics material.

It may also be provided, however, that a drive nozzle element of the drive nozzle device is made from a metallic material.

In particular, it may be provided that the drive nozzle element comprises a metallic material, in particular brass, or is made from a metallic material, in particular brass.

The drive nozzle element is preferably made from a material which is harder and/or more resistant than a material from which the suction chamber element is made.

The drive nozzle element may, for example, be made of a plastics material which is harder compared with a plastics material of the suction chamber element. For example, it may be provided that the suction chamber element is made from a thermoplastics material that can be injection molded and that the drive nozzle element is made from a particularly high-strength plastics material and/or PEEK material.

It may be provided that the drive nozzle element is formed from a ceramic material or comprises a ceramic material.

The drive nozzle element is preferably embedded in the suction chamber element.

It may be provided that the drive nozzle element is arranged or can be arranged on or in the drive nozzle element receiving means.

The drive nozzle element receiving means may, for example, be a threaded insert in the suction chamber element.

In addition, the drive nozzle element receiving means can be formed by the suction chamber element itself.

The drive nozzle element is preferably integrally configured, in particular as a metal turned part.

The drive nozzle element receiving means is preferably a portion of the suction chamber element made of a plastics material.

In particular, it may be provided that the ejector device comprises a suction chamber element configured as a plastic injection-molded component and a drive nozzle element embedded directly into the suction chamber element. The drive nozzle element is preferably a separate, stable and/or durable component that exhibits a high dimensional stability and also good precision and abrasive performance.

Direct joining to the plastic preferably results in an adequate sealing property.

The drive nozzle element may, for example, be fixed in the suction chamber element by extrusion-coating said drive nozzle element during production of the suction chamber element.

Alternatively or in addition to this, it may be provided that the drive nozzle element is fixed in the suction chamber element by hot-mounting into the previously completed suction chamber element.

In addition, it may be provided that the drive nozzle element is fixed in the suction chamber element by cold-pressing into the previously completed suction chamber element.

The previously described ejector device is particularly suitable for use in a combination of a cylinder head cover and an ejector device.

The combination preferably has one or more of the features and/or advantages described in connection with the ejector device according to the disclosure.

It may be preferable for the cylinder head cover to comprise one or more locking elements of a translational locking device and/or one or more locking elements of a rotational locking device.

The one or more locking elements of the translational locking device and/or the one or more locking elements of the rotational locking device can preferably be brought into engagement, in particular brought into latching engagement, with one or more locking elements of the translational locking device and/or of the rotational locking device arranged on the base body for the translational and/or rotational locking of the base body of the ejector device relative to the cylinder head cover.

The cylinder head cover is, or preferably comprises, a plastic injection-molded component.

In particular, the cylinder head cover comprises an integral hood body for covering a valve space of an internal combustion engine.

The cover body is, in particular, made of a plastic injection-molded part on which one or more locking elements are formed or which integrally comprises one or more locking elements.

The translational locking device and/or the rotational locking device each comprise at least one latching device or are each formed by at least one latching device.

The term "latching device" also comprises, in particular, a snap-on connection, clip connection, etc.

The term "latching" should be particularly understood to mean in this description and the attached claims a movement of two latching elements past one another, in order to fix the latching elements in respect of a locking direction engaging behind one another.

A fixing that engages behind is, in particular, a non-detachable connection of such a kind that the latching elements cannot be separated from one another by pulling them apart along the locking direction.

In order to lock latching elements, a resistance is, in particular, overcome in order to connect the latching elements to one another in a form-fitting manner in relation to the locking device. A backwards movement is then prevented by the fixing engaging behind.

Further preferred features and/or advantages of the embodiment of the disclosure are the subject matter of the following description and the graphical representation of exemplary embodiments.

BRIEF DESCRIPTION OF THE DRAWINGS

FIG. 2 shows a schematic perspective representation of a suction chamber element of the base body of the ejector device from FIG. 1;

FIG. 3 shows a schematic perspective representation of a drive nozzle element of a drive nozzle device of the base body of the ejector device from FIG. 1;

FIG. 4 shows a schematic perspective representation of a mixing channel element of the base body of the ejector device from FIG. 1;

The same or functionally equivalent elements are provided with the same reference numbers in all figures.

DETAILED DESCRIPTION OF THE DRAWINGS

Figure 1:
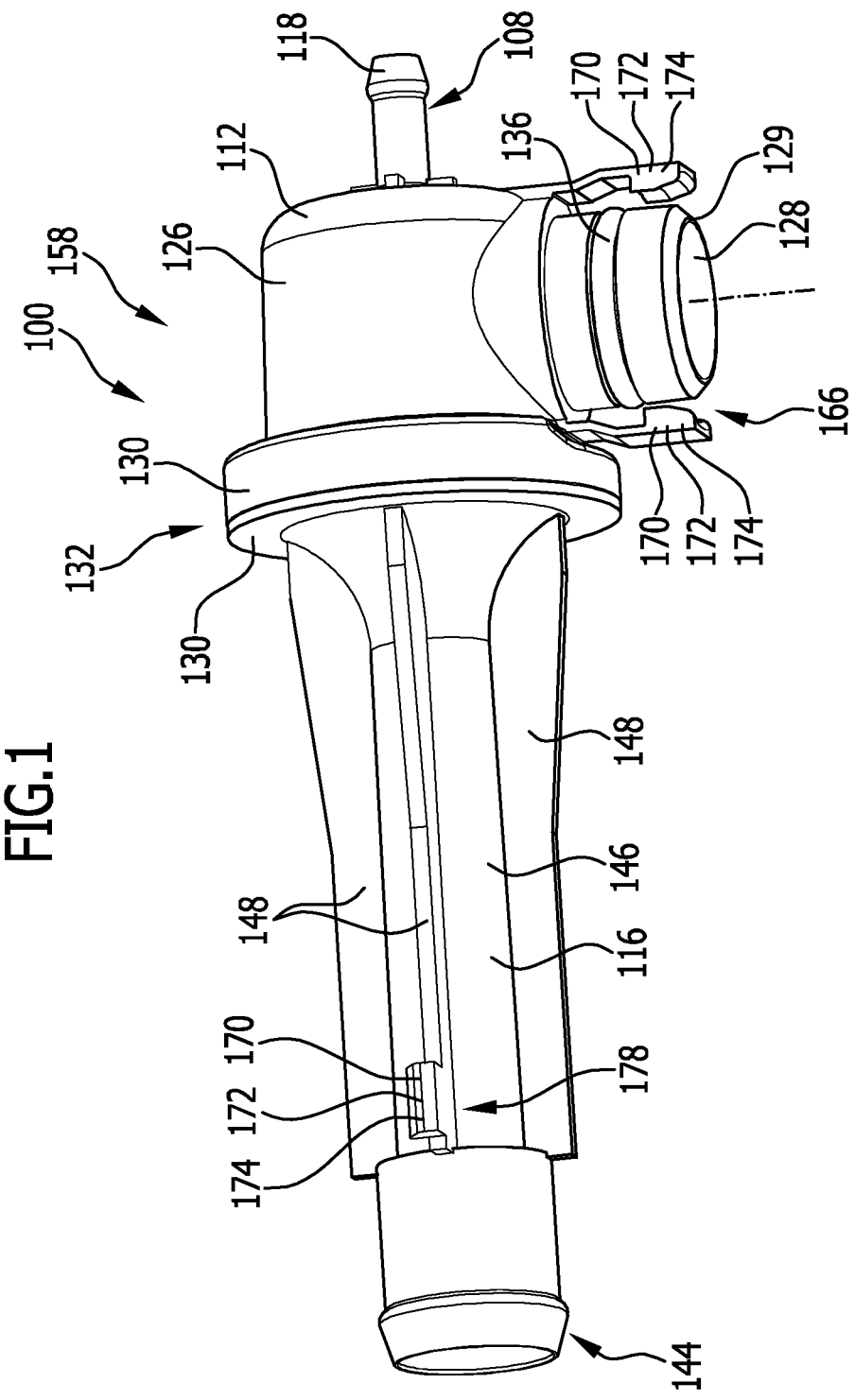
FIG. 1 shows a schematic perspective representation of a base body of an ejector device.

A first embodiment depicted in FIGS. 1 to 11 of an ejector device, referred to as a whole as 100, is used by way of example in vehicle manufacture. The ejector device 100 in this case is used in particular as a suction device for sucking out or sucking in gas containing oil mist from a crankcase of an internal combustion engine.

For this purpose, the ejector device 100 is arranged in particular on a cylinder head cover 102 of the internal combustion engine.

Firstly, details of the ejector device 100 are discussed below. The fastening of said ejector device to the cylinder head cover 102 is explained below.

The ejector device 100 comprises a suction chamber 104 for the suction of a suction medium, in particular a gas containing oil mist.

In addition, the ejector device 100 comprises a mixing channel 106 and a drive nozzle device 108.

A jet of a propelling medium can be produced by means of the drive nozzle device 108.

This jet can be directed from the suction chamber 104 and into the mixing channel 106, as a result of which a suction effect can be produced in the suction chamber 104.

The suction chamber 104 is, in particular, substantially annular or toroidal in design and surrounds the drive nozzle device 108 in a substantially annular or toroidal manner.

The suction chamber 104 is, in particular, an interior 110 of a suction chamber element 112.

The mixing channel 106 is, in particular, an interior 114 of a mixing channel element 116.

The suction chamber element 112 further comprises a propelling medium connection 118 via which propelling medium can be supplied to the drive nozzle device 108.

In addition, the suction chamber element 112 preferably comprises a propelling medium channel 120 by means of which the propelling medium, supplied via the propelling medium connection 118, can be fed to a drive nozzle element 122 of the drive nozzle device 108.

The drive nozzle element 122 is, in particular, an integral part of the suction chamber element 112 or a further component embedded in the suction chamber element 112.

In particular, the drive nozzle element 122 comprises a metallic component, in particular made of brass, which is fixed by extrusion-coating, hot-mounting or cold-pressing to or in the suction chamber element 112.

The suction chamber element 112 in this case forms, in particular, a drive nozzle element receiving means 124 for receiving the drive nozzle element 122.

The suction chamber element 112 preferably forms a housing 126 for the suction chamber 104.

A suction opening 128 is preferably provided in the housing 126.

This suction opening 128 is, in particular, an integral part of a suction channel connection 129 for connecting the suction chamber element 112 to a suction channel which is yet to be described.

The suction chamber element 112 further comprises a flange portion 130 for connecting the suction chamber element 112 to the mixing channel element 116.

The flange portion 130 is therefore, in particular, a connection portion 132.

Figure 5:
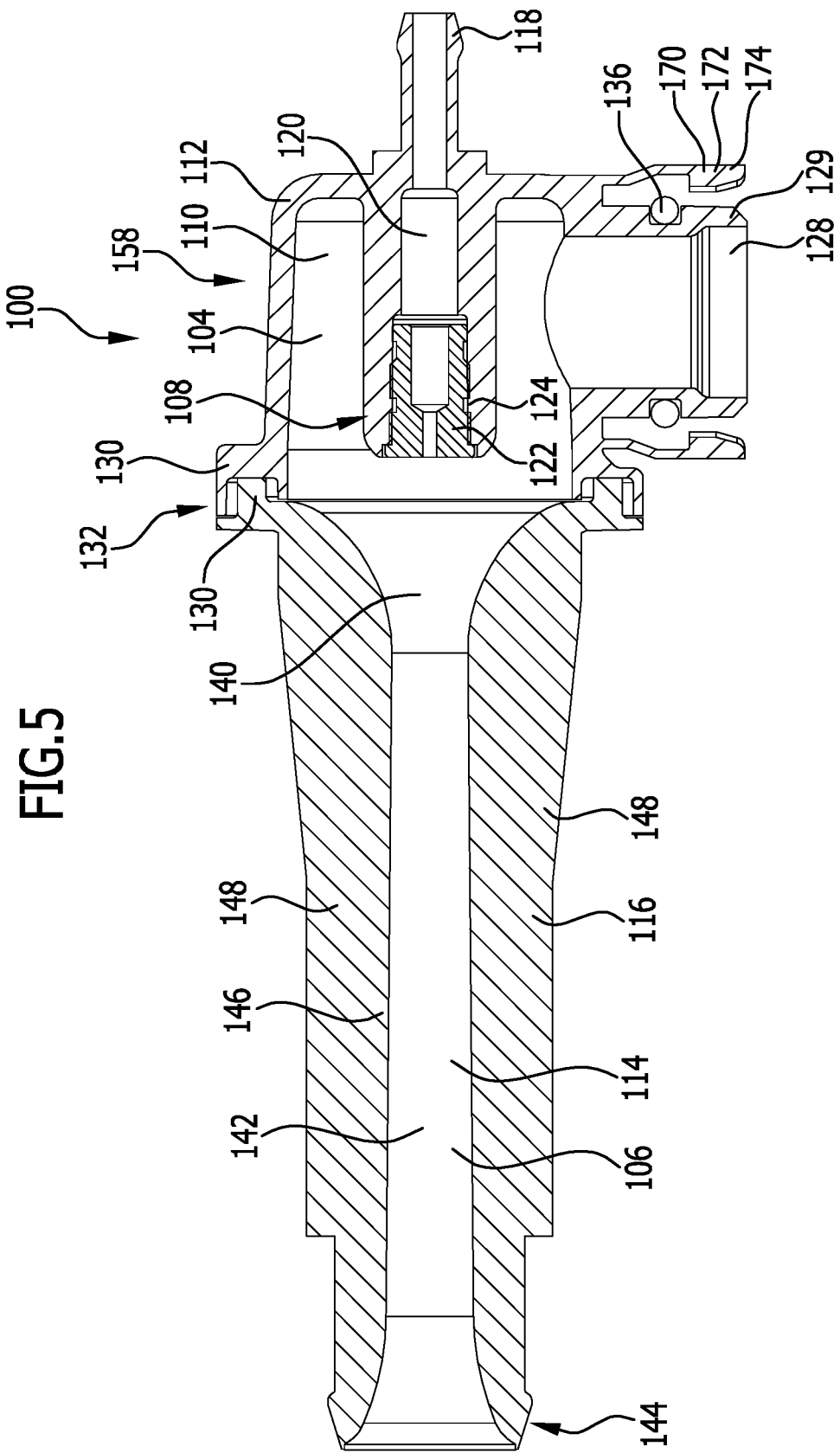
FIG. 5 shows a schematic longitudinal section through the base body from FIG. 1.
Figure 6:
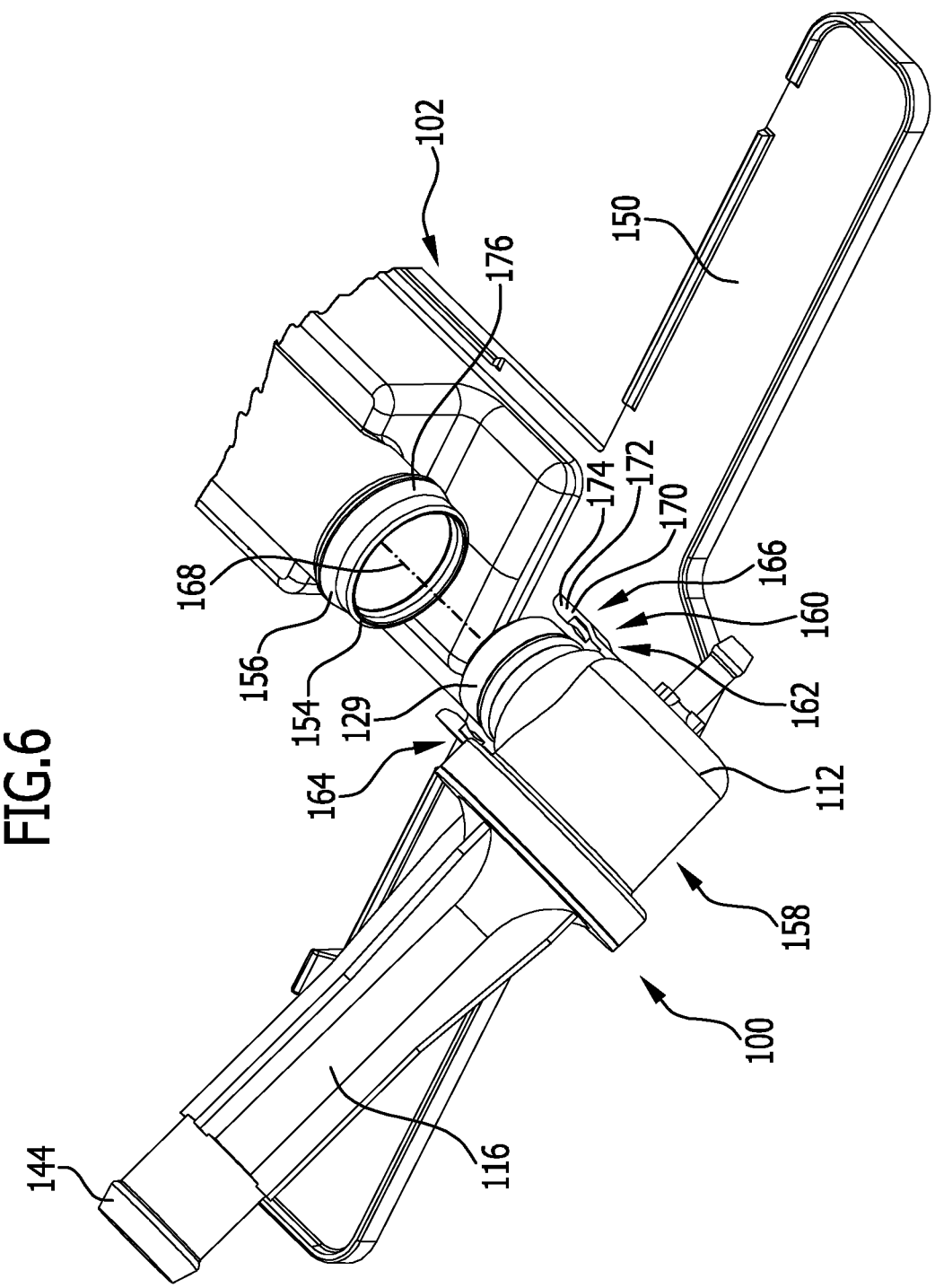
FIG. 6 shows a schematic perspective representation of the ejector device from FIG. 1 and a partially depicted cylinder head cover to which the ejector device can be fixed, wherein the ejector device is spaced apart from the cylinder head cover.

As can be inferred from FIG. 2, in particular, the suction channel connection 129 of the suction chamber element 112 preferably comprises a sealing element receiving means 134 for receiving a sealing element 136 (see FIG. 5 in particular).

The sealing element receiving means 134 is, in particular, an annular groove 138 on or in a portion of the suction channel connection 129 that can be inserted into the suction channel or fitted onto the same.

As can further be seen from FIG. 5, the mixing channel 106 comprises a tapered portion 140 which, in particular, adjoins the suction chamber 104.

In addition, the mixing channel 106 comprises an extending portion 142 which, in particular, is attached to the tapering portion 140.

Two ends lying opposite one another of the mixing channel element 116 forming or surrounding the mixing channel 106 are, on the one hand, formed by a flange portion 130 of the mixing channel element 116 and, on the other hand, by a discharge connection 144 of the mixing channel element 116.

The mixing channel element 116 forms, in particular, a housing 146 for the mixing channel 106.

As can be seen from FIGS. 1 and 4, in particular, the mixing channel element 116 comprises one or multiple stiffening ribs 148 which project radially outwards, particularly in a star-shaped configuration, from the housing 146 of the mixing channel 106.

As can be seen from FIG. 5, the suction chamber element 112 and the mixing channel element 116 are connected to one another, for example by welding, by their respective flange portions 130.

The cylinder head cover 102 and the fixing of the ejector device 100 to the cylinder head cover 102 is dealt with below.

The ejector device 100 may, however, be fixed in a comparable manner to any other components and devices.

As can be seen from FIGS. 6 to 11, in particular, the cylinder head cover 102 comprises a cover body 150, in particular, which covers a valve chamber of an internal combustion engine, in particular.

The hood body 150 is, in particular, configured as an injection-molded plastic component.

The cylinder head cover 102 preferably further comprises a suction channel 152 via which gas, in particular gas containing oil mist, can be discharged from a crankcase and/or another part of the internal combustion engine exposed to oil mist.

One end 154 of the suction channel 152 forms, in particular, a connecting piece 156 for joining and/or connecting and/or fixing the ejector device 100.

The ejector device 100 may comprise the suction channel 152.

For simple reference and explanation, reference is made to a base body 158 of the ejector device 100 below, rather than to the entire ejector device 100.

This base body 158 is, in particular, formed by the suction chamber element 112, the mixing channel element 116 and the drive nozzle device 108, in particular the drive nozzle element 122.

Where necessary, the sealing element 136 may also be an integral part of the base body 158 or, however, fixed to the same.

In order to fasten the base body 158 of the ejector device 100 to the cylinder head cover 102, a fastening device 160 of the ejector device 100 is, in particular, provided.

The fastening device 160 comprises, in particular, one or more locking devices 162 which are preferably configured as latching devices 164.

The fastening device 160 preferably comprises a translational locking device 166 for fixing the base body 158 to the suction channel 152 in such a manner that a displacement of the base body 158 relative to the suction channel 152 along a center axis 168 of the connecting piece 156 is effectively prevented.

By means of the translational locking device 166, the base body 158 can preferably be slipped onto the suction channel 152 and fixed to the suction channel 152 in such a manner that the base body 158 can no longer be removed from the suction channel 152 against a pushing direction (at least not without a special actuation of the translational locking device 166).

The translational locking device 166 comprises, in particular, one or multiple locking elements 170.

A locking element 170 of the translational locking device 166 is, in particular, configured as a latching element 172, for example as a latching hook 174.

Multiple locking elements 170 of this kind are preferably provided.

In particular, the translational locking device 166 comprises two locking elements 170 configured as latching hooks 174.

In addition, the translational locking device 166 preferably comprises a locking element 170 configured as a latching ring 176.

The locking elements 170 configured as latching hooks 174 can preferably be locked with the locking element 170 configured as a latching ring 176, in order to achieve translational locking.

The latching hooks 174 are preferably arranged and/or configured on the suction chamber element 112 of the base body 158.

The latching ring 176 is preferably arranged and/or configured on the connecting piece 156 of the suction channel 152.

A reverse arrangement may also be provided however, in that the latching hooks 174 are arranged and/or configured on the connecting piece 156 of the suction channel 152, while the latching ring 156 is arranged and/or configured on the suction chamber element 112 of the base body 158.

By means of the latching hook 174, the latching ring 156 can preferably be engaged behind in a form-fitting manner along the center axis 168.

The latching ring 176 is preferably rotationally symmetrical in design.

Figure 7:
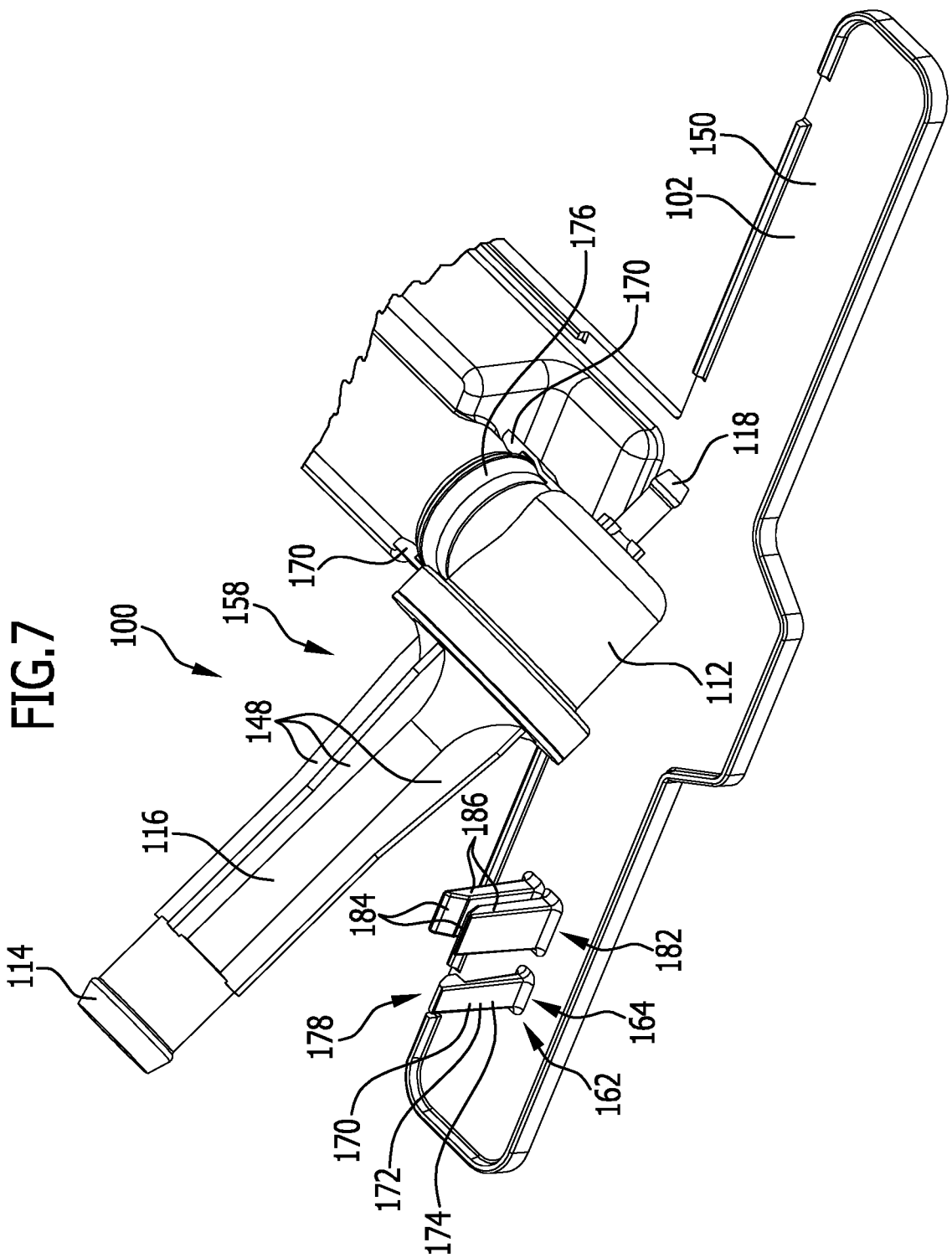
FIG. 7 shows a schematic representation of the ejector device and the cylinder head cover corresponding to FIG. 6, wherein the ejector device is slipped onto a suction channel of the cylinder head cover and is locked thereto.
Figure 8:
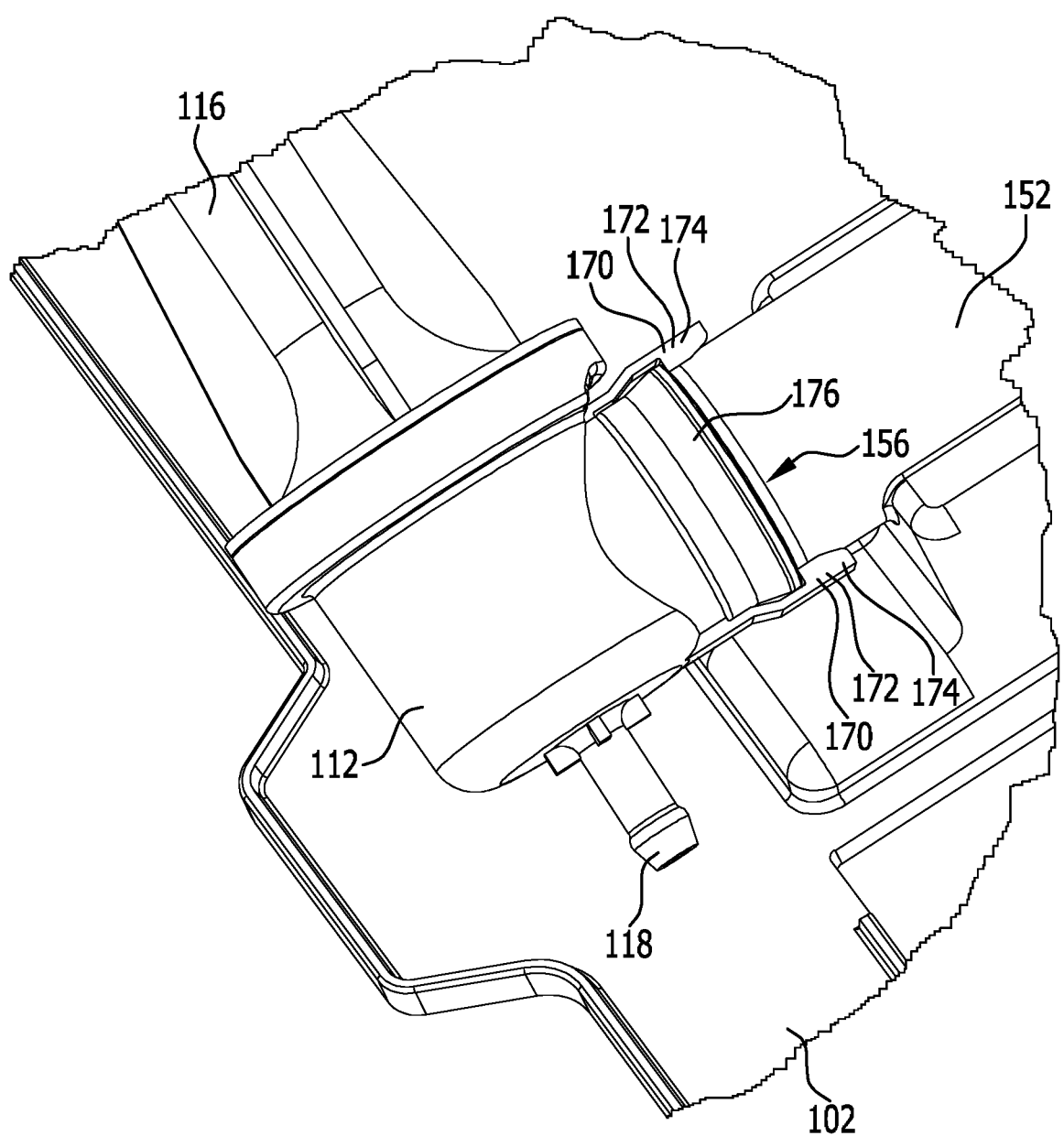
FIG. 8 shows an enlarged representation of a connecting piece of the suction channel along with the part of the ejector device fastened thereto.

In the translationally locked state of the base body 158 of the ejector device 100 to the cylinder head cover 102 depicted in FIGS. 7 and 8, a rotational movement of the base body 158 about the center axis 168 is therefore preferably still possible.

The base body 158 can therefore be fitted to the suction channel 152 in different rotational orientations. Subsequent to this and therefore following the translational locking, a further fixing can then take place in order to avoid any relative movement of the base body 158 relative to the cylinder head cover 102.

Figure 9:
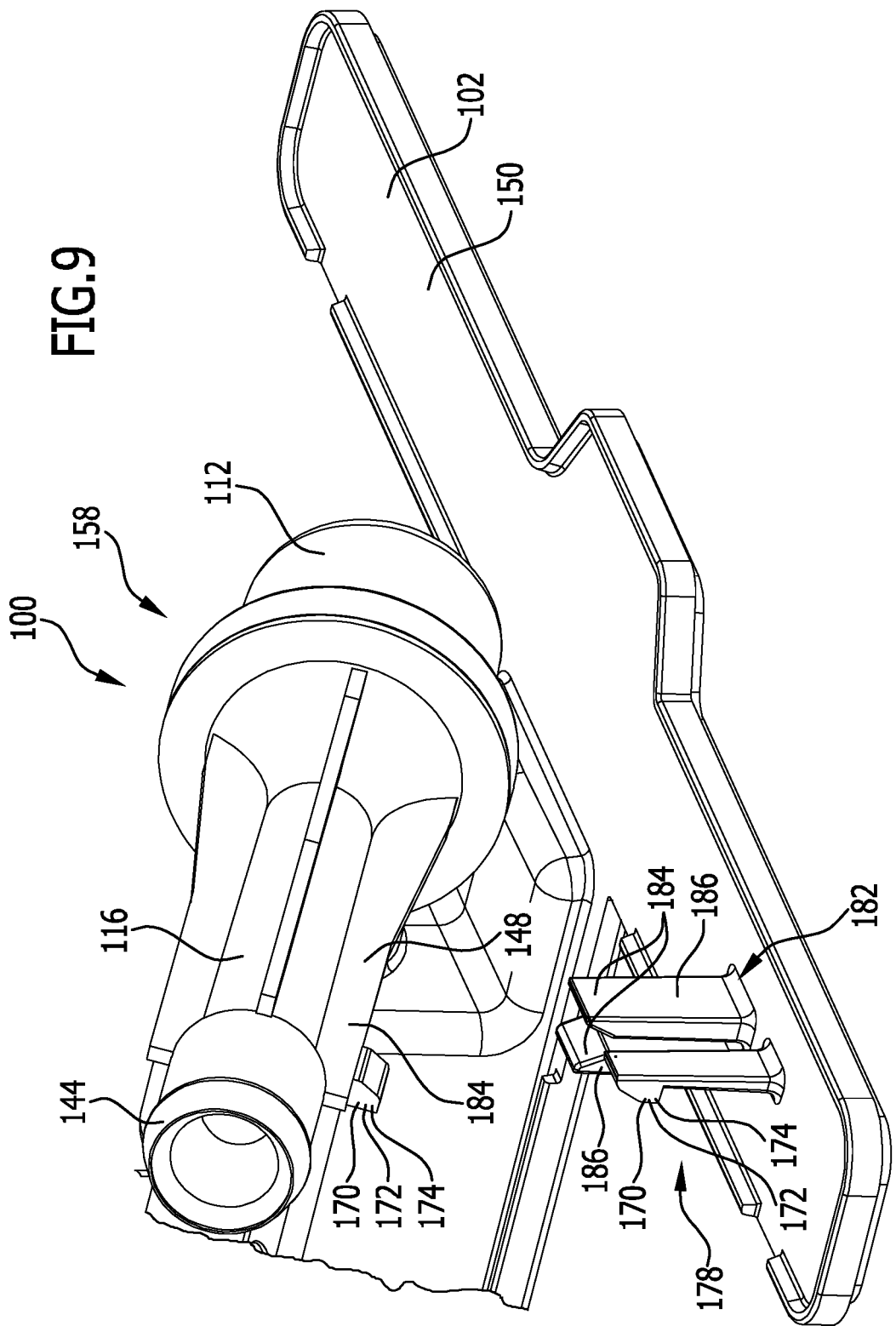
FIG. 9 shows a further schematic perspective representation of the ejector device and the cylinder head cover in the state shown in FIG. 7.
Figure 10:
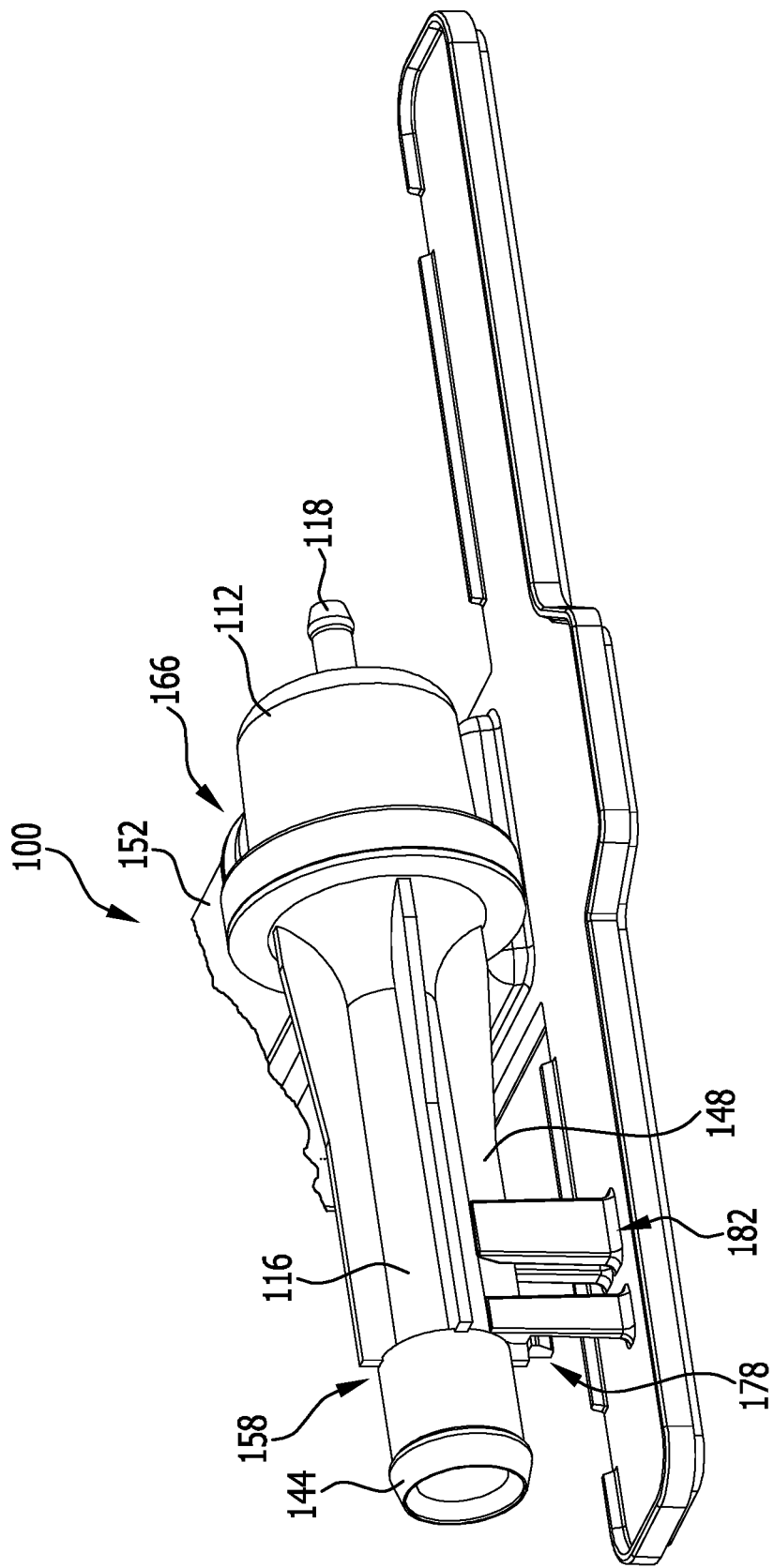
FIG. 10 shows a schematic perspective representation of the ejector device and the cylinder head cover, wherein the ejector device, on the one hand, is fixed to the suction channel by means of a translational locking device and, on the other hand, to the cylinder head cover by means of a rotational locking device.
Figure 11:
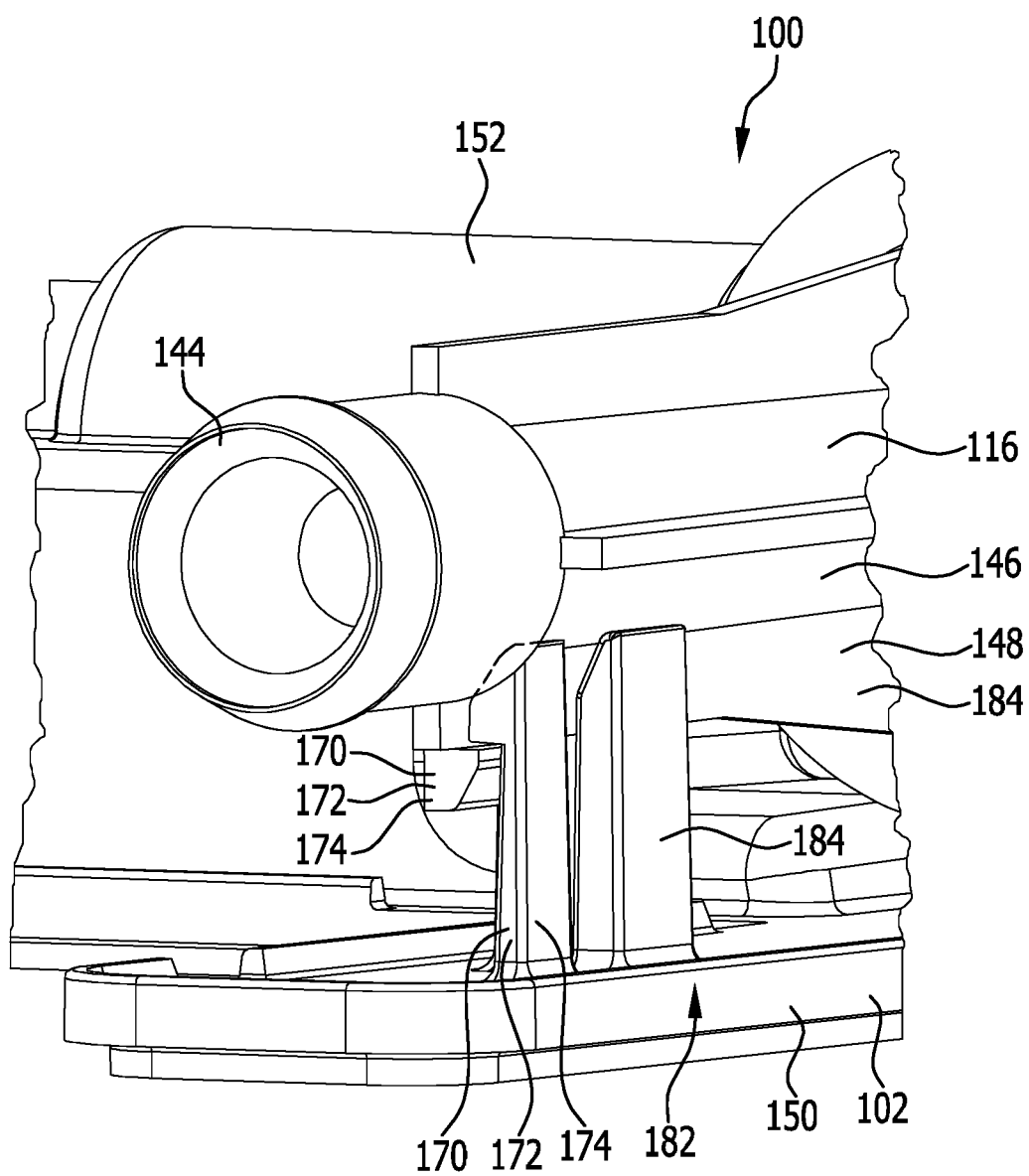
FIG. 11 shows an enlarged representation of the rotational locking device from FIG. 10.

This further fixing is, in particular, brought about by means of a rotational locking device 178 (see FIGS. 9 to 11).

The rotational locking device 178 preferably comprises one or more locking elements 170.

The locking elements 170 of the rotational locking device 178 are configured as latching elements 172, for example, in particular as latching hooks 174.

A locking element 170 of the rotational locking device 178 configured as a latching hook 174 is preferably arranged and/or configured on the mixing channel element 116 of the base body 158.

A further locking element 170 of the rotational locking device 178 configured as a latching hook 174 is preferably arranged and/or configured on the cylinder head cover 102.

The two latching hooks 174 can, in particular, be brought into engagement with one another by a rotational movement of the base body 158 about the center axis 168, in particular about the base body 158 of the ejector device 100, in a predefined rotational orientation relative to the suction channel 152 (see FIGS. 10 and 11, in particular).

A locking element 170 of the rotational locking device 178 configured as a latching hook 174 is, in particular, configured and/or arranged on an end region 180 of the mixing channel element 116 facing away from the suction chamber element 112. Due to the spacing of the rotational locking device 178 from the center axis 168 of the connecting piece 156 of the suction channel 152 resulting from this, a large lever effect can be obtained, as a result of which a reliable and secure rotational fixing of the base body 158 on the cylinder head cover 102 is produced.

The ejector device 100 may, in addition, comprise a positioning device 182.

A positioning device 182 of this kind is used, in particular, for the reliable positioning of the base body 158 during and/or after the locking of the latching elements 174 of the rotational locking device 178.

In particular, by means of the positioning device 182 it is preferably possible to prevent the locking elements 170 of the rotational locking device 178 configured as latching elements 174 coming into engagement with one another during operation of the ejector device 100, in particular during operation of the internal combustion engine, because the end region 180 of the mixing channel element 116 which would not be further secured otherwise could be subject to sharp vibrations or movements.

The positioning device 182 comprises, in particular, one or more positioning elements 184.

For example, two positioning elements 184 configured as projections 186 are arranged and/or configured on the cylinder head cover 102.

A stiffening rib 148 of the mixing channel element 116 acting as a positioning element 184 can, in particular, be inserted between these two projections 186, so that the entire mixing channel element 116 and therefore the base body 158 can ultimately be reliably positioned.

The base body 158 can, in particular, be produced as follows:

The suction chamber element 112 and the mixing channel element 116 are preferably produced to begin with as individual injection-molded plastic components that differ from one another.

In addition, the drive nozzle element 122 is produced, in particular by forming, for example turning, a metal part.

In a next step, the drive nozzle element 122 is connected to the suction chamber element 112, for example by hot-mounting or cold-pressing.

It may also be provided, however, that by extrusion-coating the drive nozzle element 122 with plastic during production of the suction chamber element 112, said drive nozzle element is arranged on and/or in the suction chamber element 112.

In a further step the suction chamber element 112 and the mixing channel element 116 are connected to one another.

In particular, the two flange portions 130 of the suction chamber element 112 and the mixing channel element 116 are welded to one another by plastics welding.

In particular, a gas-tight connection results in this case.

Finally, a sealing element 136 is preferably arranged in the sealing element receiving means 134.

A base body 158 of the ejector device 100 completed in this way is then slid onto the connecting piece 156 of the suction channel 152 along the center axis 168 with the suction channel connection 130 of the suction chamber element 112.

The latching hook 174 of the translational locking device 166 engages behind the latching ring 176 of the translational locking device 166 in this case, so that the base body 158 is secured to prevent displacement of the same relative to the suction channel 152.

In a further step, the base body 158 is rotated about the center axis 168 of the connecting piece 156, until the two locking elements 170 of the rotational locking device 178 configured as latching hooks 174 engage with one another.

In addition, during this rotation of the base body 158 about the center axis 168 of the connecting piece 156, optimum positioning of the base body 158 arises when a stiffening rib 148 of the mixing channel element 116 acting as a positioning element 184 is inserted between two positioning elements 184 configured as projections 186.

The fact that both the translational locking device 166 and also the rotational locking device 178 allow a latching fixing of the base body 158 to the cylinder head cover 102 means that said fixing can take place in a tool-free manner and therefore at particularly low cost.

A second embodiment of an ejector device 100 depicted in FIGS. 12 to 16 differs from the first embodiment depicted in FIGS. 1 to 11 substantially in that as an alternative or in addition to the rotational locking device 178 depicted in FIGS. 1 to 11, a rotational locking device 178 arranged and/or configured in the region of the suction channel connection 130 and of the connecting piece 156 is provided.

The rotational locking device 178 in this case is created, on the one hand, by one or more locking elements of the translational locking device 166 and, on the other hand, by one or more locking elements 170 of the rotational locking device 178 configured as depressions 188.

The locking elements 170 which can therefore be assigned both to the translational locking device 166 and to the rotational locking device 178 are particularly configured as latching hooks 174.

The depressions 188 are, in particular, arranged on a side of a locking element 170 of the translational locking device 166 configured as a latching ring 176 facing away from the suction chamber 104.

The depressions 188 in this case are not completely circular, in particular not annularly closed in design, but only create local depressions 188 in a region of the connecting piece 156 preferably located directly behind the latching ring 176.

Figure 12:
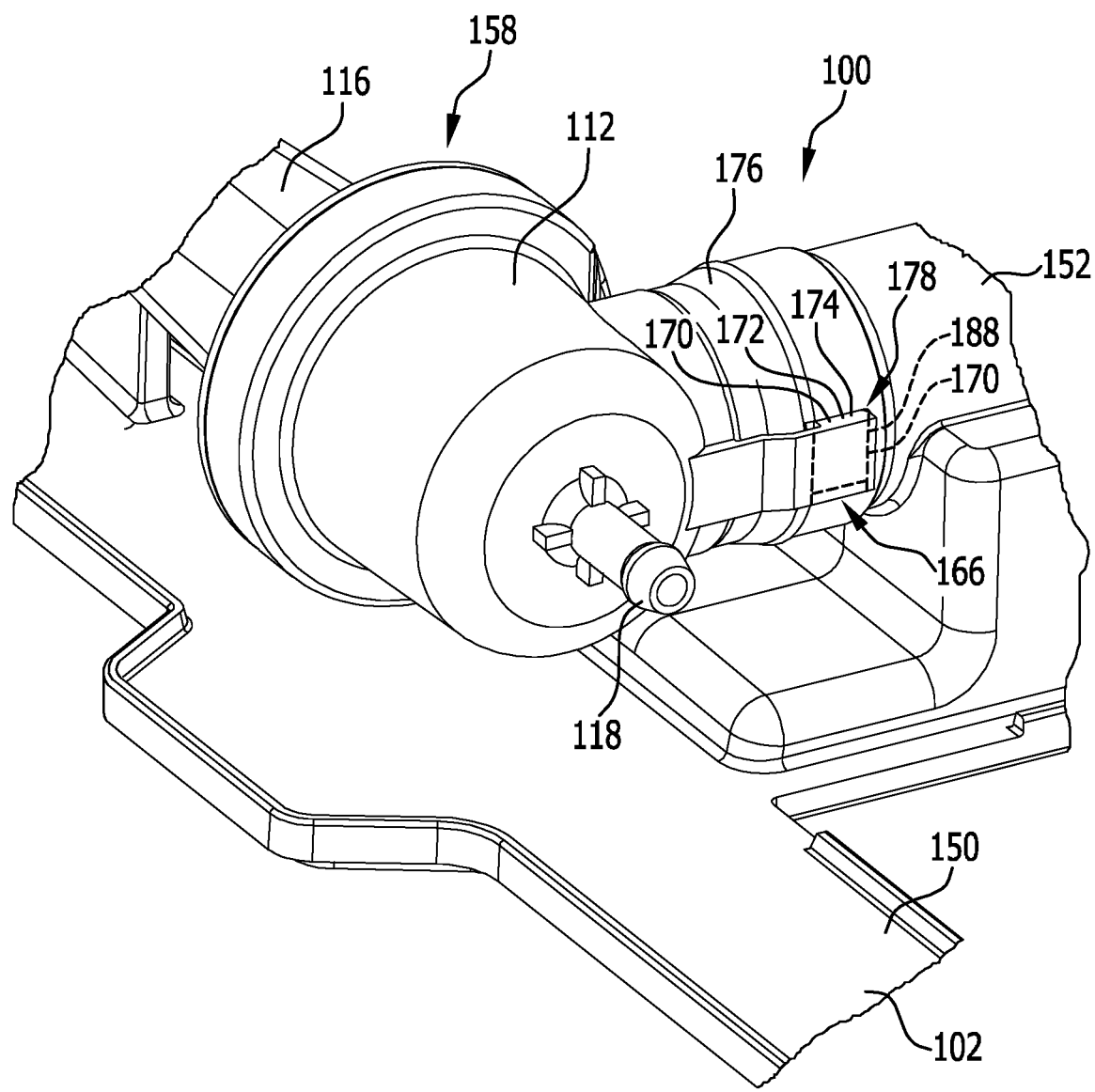
FIG. 12 shows a schematic perspective representation of a second embodiment of an ejector device along with a cylinder head cover for fixing the ejector device, wherein a rotational locking device acting on the connecting piece of the suction channel is provided.
Figure 13:
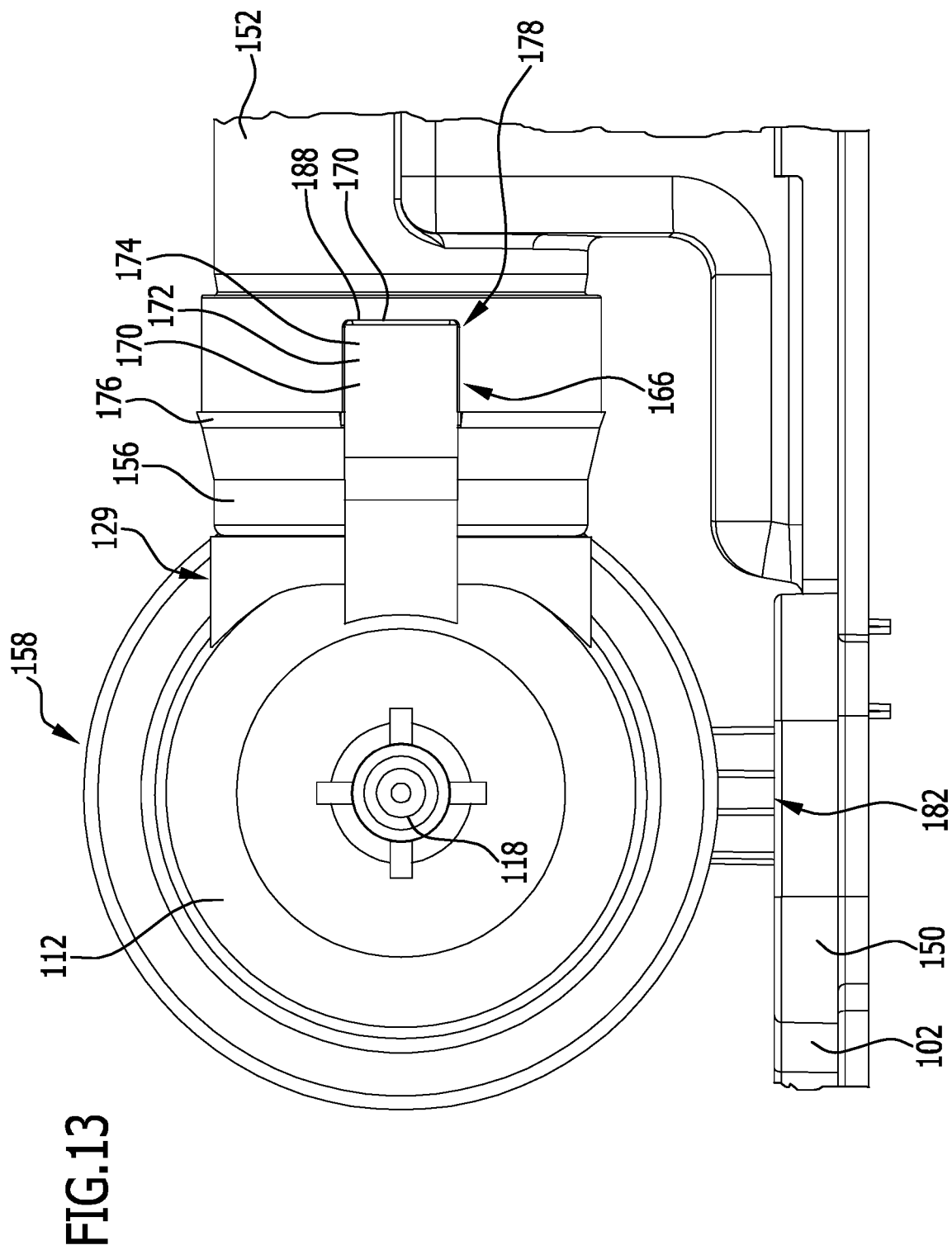
FIG. 13 shows a schematic side view of a suction chamber element of the base body of the ejector device and a connecting piece of the suction channel of the combination of ejector device and cylinder head cover from FIG. 12.
Figure 14:
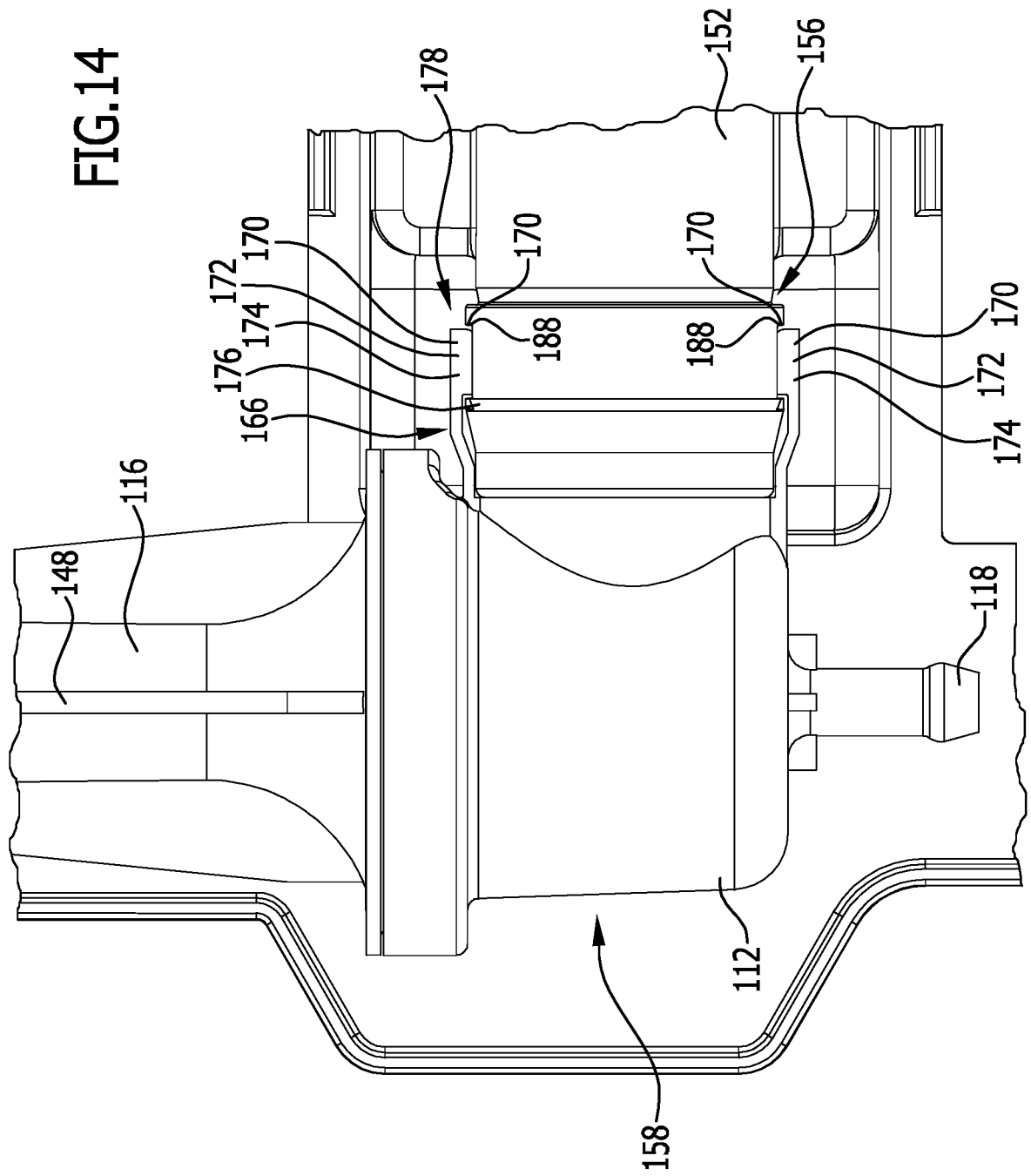
FIG. 14 shows a schematic plan view from above of the combination of ejector device and cylinder head cover according to FIG. 13.
Figure 15:
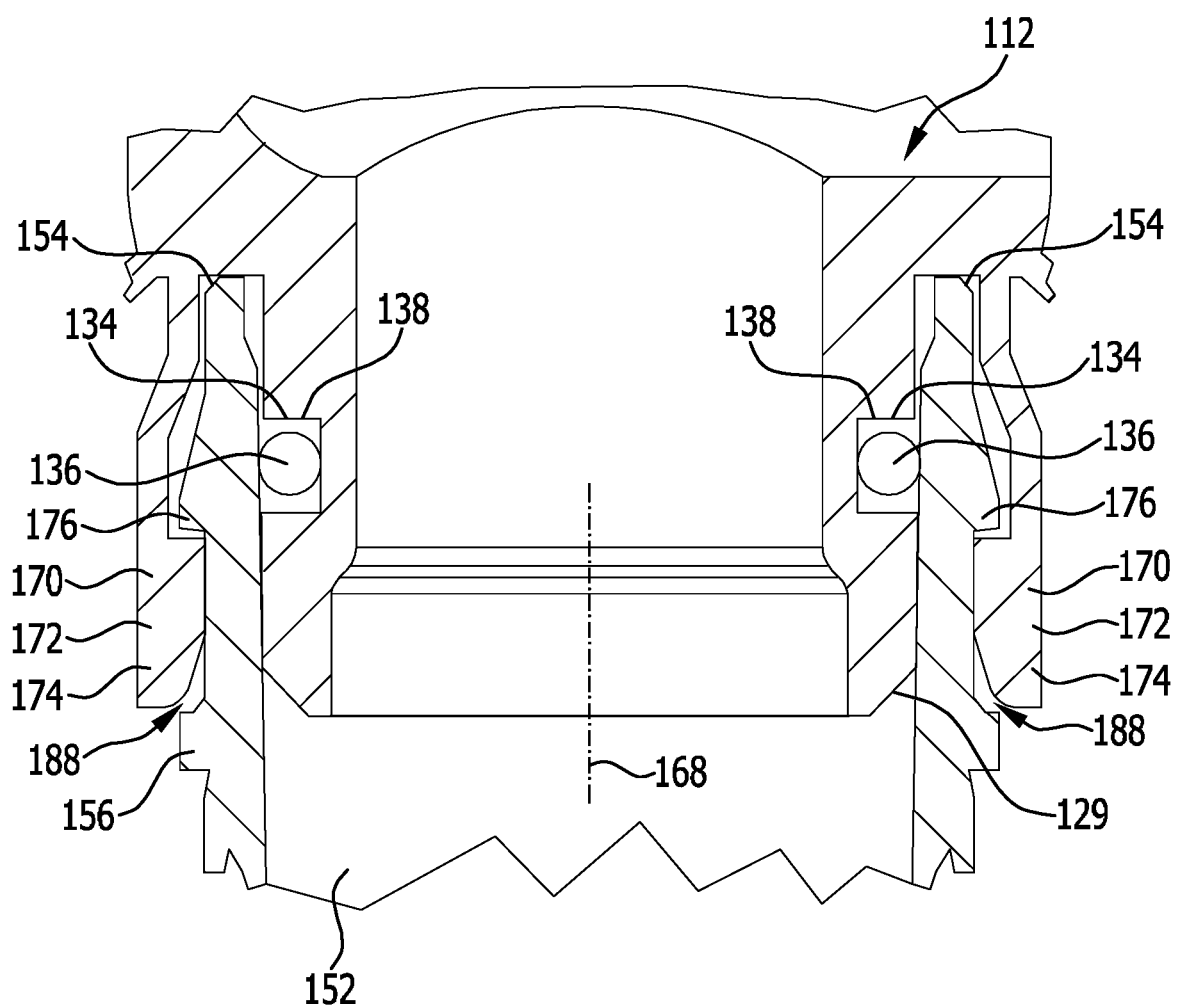
FIG. 15 shows a schematic section through the connecting piece of the suction channel and the part connecting thereto of the suction chamber element of the base body of the combination from FIG. 12.
Figure 16:
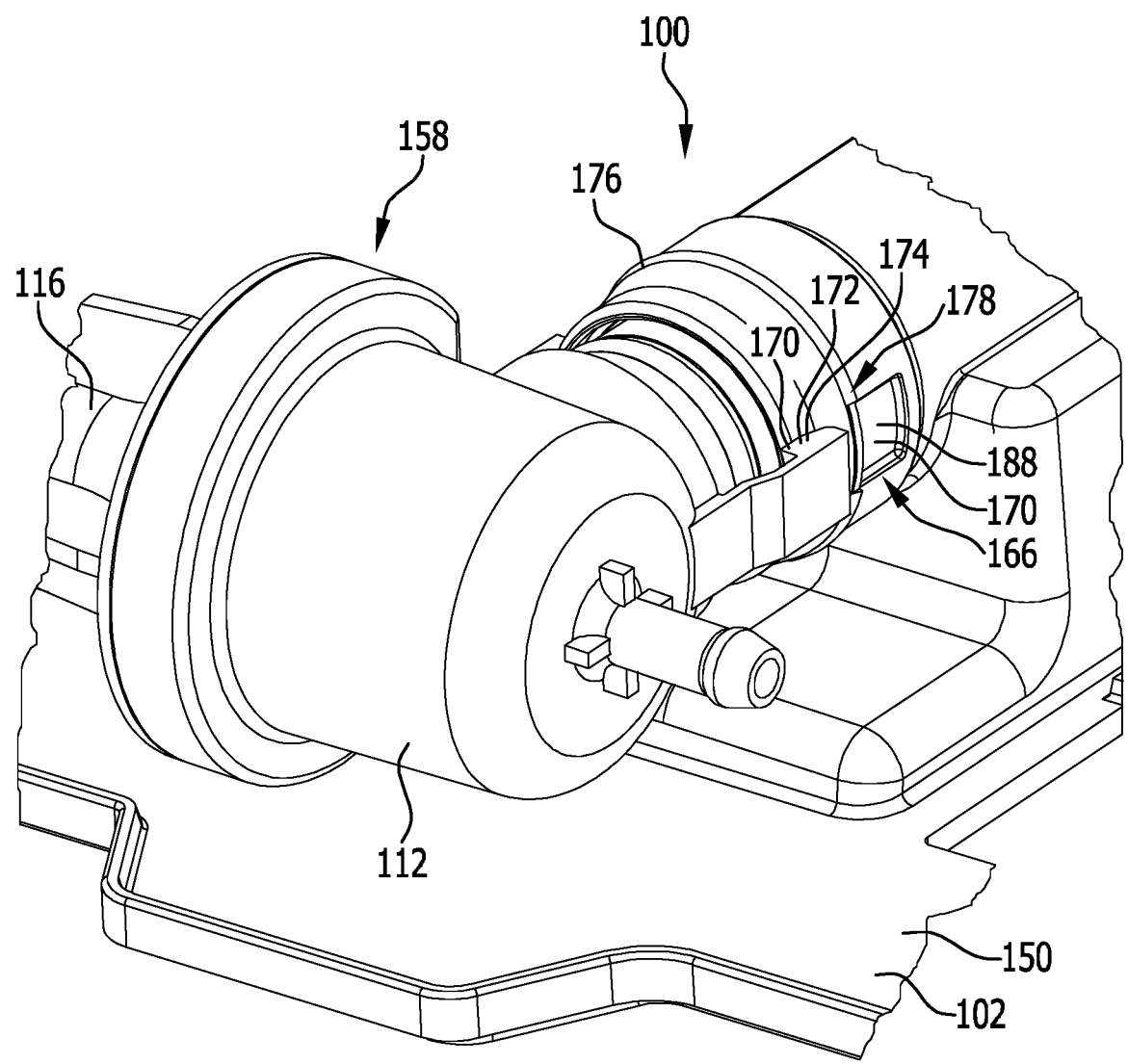
FIG. 16 shows a schematic perspective representation of the combination of ejector device and cylinder head cover according to FIG. 12, wherein the base body of the ejector device is separate from the suction channel.

As emerges from a comparison of FIGS. 12 and 13, in particular, the locking elements 170 configured as latching hooks 174 and the locking elements 170 configured as depressions 188 are preferably configured and/or arranged in such a manner that they can be fixed to one another in a form-fitting manner in a circumferential direction of the connecting piece 176.

In the case of the embodiment of the ejector device 100 depicted in FIGS. 12 to 16, the base body 158 can likewise, as in the case of the embodiment depicted in FIGS. 1 to 11, be slid onto the connecting piece 156 of the suction channel 152 in a plurality of different rotational orientations, in order to achieve translational locking.

Subsequently, rotational locking can be carried out through a rotation of the base body 158 about the center axis 168 of the connecting piece 156. In this case, the locking elements 170 configured as latching hooks 174 and engaging behind the latching ring 176 are moved in the circumferential direction until they engage with the depressions 188 and are fixed therein in a form-fitting manner in relation to the circumferential direction.

Due to this form-fitting fixing, the entire base body 158 is then secured relative to the suction channel 152 to prevent further rotation.

Otherwise, the second embodiment of the ejector device 100 depicted in FIGS. 1 to 16 corresponds to the first embodiment depicted in FIGS. 1 to 11 in terms of design and function, so that to this extent reference is made to the preceding description thereof.

Figure 17:
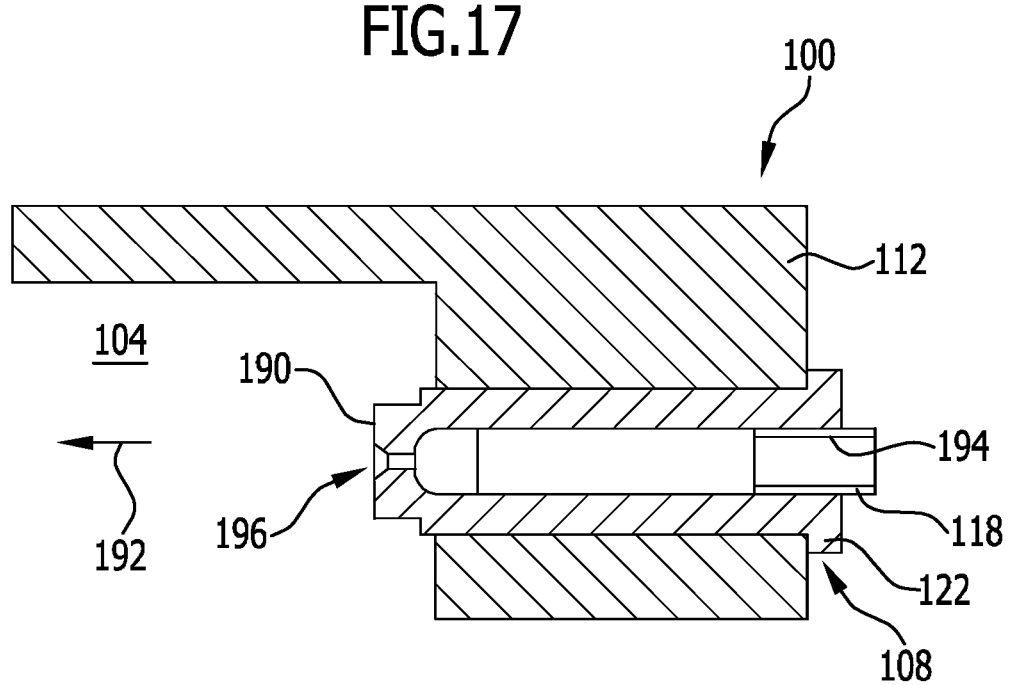
FIG. 17 shows a schematic sectional representation of an embodiment of a drive nozzle device.
Figure 18:
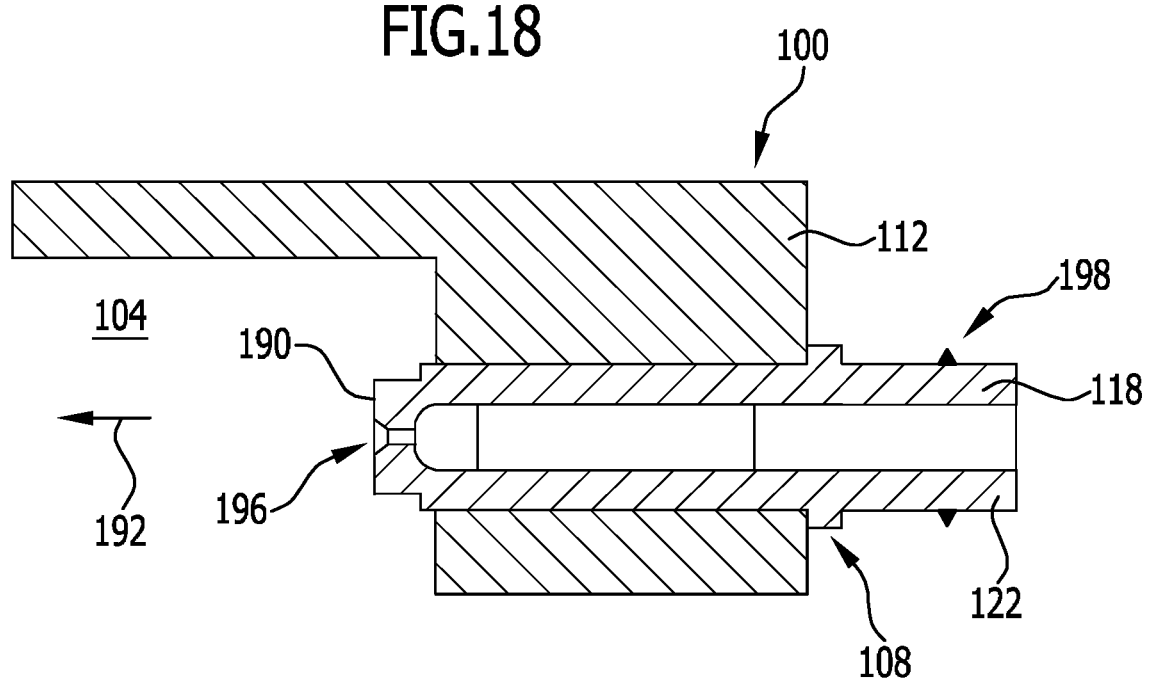
FIG. 18 shows a schematic representation of a further embodiment of a drive nozzle device corresponding to FIG. 17.

FIGS. 17 and 18 show different variants of drive nozzle devices 108 which may be provided as alternatives to the embodiment depicted in FIGS. 1 to 11.

In the embodiment of the drive nozzle device 108 shown in FIG. 17 it is provided, in particular, that the drive nozzle element 122 extends starting from an end 190 opening into the suction chamber 104 against a jet direction 192 into a region outside the suction chamber element 112.

A propelling medium channel 120 that differs from the drive nozzle element 122 is not therefore provided. Instead, the drive nozzle element 122 itself at the same time forms the drive medium connection 118.

The drive medium connection 118 may, for example, be configured as an internal thread 194 in a substantially hollow-cylindrical drive nozzle element 122, for example.

A connection line for supplying propelling medium can, in particular, be screwed into this internal thread 194.

The end 190 of the drive nozzle element 122 facing the suction chamber 104 is provided with a swirl plate 196, for example.

By means of a swirl plate 196 of this kind, a swirl flow can be generated in the mixing channel 106, in particular. This is used, in particular, for an optimized suction action.

Otherwise, the embodiment of the drive nozzle device 108 shown in FIG. 17 corresponds to the embodiment shown in FIGS. 1 to 11 in terms of design and function and also in terms of production, so that to this extent reference can be made to the preceding description thereof.

In particular, the embodiment of the drive nozzle device 108 shown in FIG. 17 can also be produced in such a manner that by extrusion-coating the drive nozzle element 122 with plastic during production of the suction chamber element 112, said drive nozzle element is arranged on the suction chamber element 112. As an alternative to this, hot-mounting or cold-pressing of the drive nozzle element 122 in the suction chamber element 112 may be provided.

A further embodiment of a drive nozzle device 108 depicted in FIG. 18 differs substantially from the embodiment depicted in FIG. 17 in that a kind of quick-release coupling 198 is provided as the propelling medium connection 118.

Otherwise, the embodiment of the drive nozzle device 108 depicted in FIG. 18 coincides in terms of design and function and also in terms of production with the embodiment depicted in FIG. 17, so that to this extent reference can be made to the preceding description thereof.

Preferred embodiments are the following:
1. An ejector device (100) comprising a base body (158) which comprises the following:
   a suction chamber (104) for sucking in a suction medium;
   a mixing channel (106) for mixing a propelling medium with the suction medium;
   a drive nozzle device (108) for generating and directing a propelling medium jet along a jet direction (192) from the suction chamber (104) and into the mixing channel (106).
2. The ejector device (100) according to embodiment 1, characterized in that the base body (158) comprises a suction chamber element (112) surrounding the suction chamber (104) and/or a mixing channel element (116) surrounding the mixing chamber (106).
3. The ejector device (100) according to embodiment 2, characterized in that the suction chamber element (112) and the mixing channel element (116) are formed by plastic injection-molded components that differ from one another and are connected to one another following the individual production process in each case.
4. The ejector device (100) according to embodiment 3, characterized in that the suction chamber element (112) and the mixing channel element (116) are connected to one another, in particular welded to one another, in a flange region.
5. The ejector device (100) according to one of embodiments 1 to 4, characterized in that the mixing channel (106), in particular a mixing channel element (116) of the base body (158), comprises the following: a tapering portion (140) that is connected to the suction chamber (104) along the jet direction (192) and which has an inner cross-sectional area that decreases continuously and/or constantly along the jet direction (192) and/or a widening portion (142) that adjoins the tapering portion (140) along the jet direction (192) and which has an inner cross-sectional area that increases continuously and/or constantly along the jet direction (192).
6. The ejector device (100) according to one of embodiments 1 to 5, characterized in that a suction chamber element (112) of the base body (158) comprises one or more or all of the following components:
   a housing (146) for the suction chamber (104);
   a suction channel connection (129);
   a propelling medium connection (118);
   a drive nozzle element receiving means (124);
   a propelling medium channel (120) for the fluidic connection of the propelling medium connection (118) to the drive nozzle element receiving means (124);
   a flange portion (130) for connecting the suction chamber element (112) to a mixing channel element (116) of the base body (158) that differs therefrom;
   one or more locking elements (170) of a translational locking device (166) of a fastening device (160) for fastening the base body (158) to a suction channel (152);
   one or more locking elements (170) of a rotational locking device (178) of a fastening device (160) for fastening the base body (158) to a suction channel (152);
   a positioning device (182) for positioning the suction chamber element (112) relative to a translational locking device (166) and/or relative to a rotational locking device (178).
7. The ejector device (100) according to one of embodiments 1 to 6, characterized in that a mixing channel element (116) of the base body (158) comprises one or more or all of the following components:
   a housing (146) for the mixing channel (106);
   a discharge connection (144);

a flange portion (130) for connecting the mixing channel element (116) to a suction chamber element (112) of the base body (158) that differs therefrom;

one or more locking elements (170) of a translational locking device (166) of a fastening device (160) for fastening the base body (158) to a suction channel (152);

one or more locking elements (170) of a rotational locking device (178) of a fastening device (160) for fastening the base body (158) to a suction channel (152);

a positioning device (182) for positioning the mixing channel element (116) relative to a translational locking device (166) and/or relative to a rotational locking device (178).

8. The ejector device (100) according to one of embodiments 1 to 7, characterized in that a suction chamber element (112) of the base body (158) is a standard component for receiving drive nozzle elements (122) of a different kind and/or size and/or for connecting to mixing channel elements (116) of a different kind and/or size.

9. The ejector device (100) according to one of embodiments 1 to 8, characterized in that a suction chamber element (112) and/or a mixing chamber element (116) of the base body (158) are configured as plastic injection-molded components and have a main demolding direction which is substantially parallel to the jet direction (192).

10. The ejector device (100) according to one of embodiments 1 to 9, characterized in that the ejector device (100) comprises a fastening device (160) for fastening the base body (158) of the ejector device (100) to a suction channel (152), wherein the fastening device (160) comprises a translational locking device (166) for avoiding a translational movement of the base body (158) relative to the suction channel (152) in a direction running parallel to a center axis (168) of a connecting piece (156) of the suction channel (152).

11. The ejector device (100) according to one of embodiments 1 to 10, characterized in that the ejector device (100) comprises a fastening device (160) for fastening the base body (158) of the ejector device (100) to a suction channel (152), wherein the fastening device (160) comprises a rotational locking device (178) to prevent rotation of the base body (158) relative to the suction channel (152).

12. The ejector device (100) according to one of embodiments 1 to 11, characterized in that the ejector device (100) comprises a fastening device (160) for fastening the base body (158) of the ejector device (100) to a suction channel (152), wherein the fastening device (160) comprises a translational locking device (166) and a rotational locking device (178), wherein the translational locking device (166) and the rotational locking device (178) are
a) different from one another,
b) spatially separate from one another,
c) functionally separate from one another,
d) actuable independently of one another and/or
e) actuable consecutively.

13. The ejector device (100) according to one of embodiments 11 and 12, characterized in that the translational locking device (166) and/or the rotational locking device (178) each comprise one or more locking elements (170), in particular latching elements (172), and/or latching receiving means.

14. The ejector device (100) according to embodiment 13, characterized in that one or more locking elements (170) of the translational locking device (166) and/or of the rotational locking device (178) are configured as projections (186), in particular as latching hooks (174), on a suction chamber element (112) of the base body (158).

15. The ejector device (100) according to one of embodiments 13 and 14, characterized in that one or more locking elements (170) of the translational locking device (166) and/or of the rotational locking device (178) are configured as projections (186), in particular as latching hooks (174), on a mixing channel element (116) of the base body (158).

16. The ejector device (100) according to one of embodiments 13 to 15, characterized in that a locking element (170) of the translational locking device (166) is configured as an annular bead or thickening, in particular as a latching ring (176), on an outside of a connecting piece (156) of the suction channel (152).

17. The ejector device (100) according to one of embodiments 13 to 16, characterized in that one or more locking elements (170) of the translational locking device (166) and/or of the rotational locking device (178) are configured as depressions (188) in a connecting piece (156) of the suction channel (152).

18. The ejector device (100) according to one of embodiments 13 to 17, characterized in that one or more locking elements (170) of the translational locking device (166) and/or of the rotational locking device (178) are arranged on a half of the mixing channel element (116) facing away from the suction chamber (104), in particular on an end region (180) of the mixing channel element (116) facing away from the suction chamber (104).

19. The ejector device (100) according to one of embodiments 1 to 18, characterized in that the ejector device (100) comprises a fastening device (160) by means of which the base body (158) can initially be slipped onto a connecting piece (156) of a suction channel (152) through a translational movement along a translational direction and by means of which the base body (158) can then be rotated about a center axis (168) of the connecting piece (156) and can thereby be fixed in a rotational orientation relative to the connecting piece (156).

20. The ejector device (100) according to one of embodiments 1 to 19, characterized in that the ejector device (100) comprises a suction chamber element (112) configured as a plastic injection-molded component and a drive nozzle element (122) embedded in the suction chamber element (112).

21. The ejector device (100) according to embodiment 20, characterized in that the drive nozzle element (122) comprises a metallic material, in particular brass, or is made from a metallic material, in particular brass.

22. The ejector device (100) according to one of embodiments 20 and 21, characterized in that the drive nozzle element (122) is fixed in the suction chamber element (112)
a) by extrusion-coating said drive nozzle element during production of the suction chamber element (112),
b) by hot-mounting into the previously completed suction chamber element (112) or
c) by cold-pressing into the previously completed suction chamber element (112).

23. A combination of a cylinder head cover (102) and an ejector device (100) according to one of embodiments 1 to 22.

24. A combination according to embodiment 23, characterized in that the cylinder head cover (102) comprises one or more locking elements (170) of a translational locking device (166) and/or one or more locking elements (170) of a rotational locking device (178) which can be brought into engagement for the translational and/or rotational locking of the base body (158) of the ejector device (100) relative to the cylinder head cover (102) with one or more locking elements (170) of the translational locking device (166) and/or the rotational locking device (178) arranged on the base body (158).

The invention claimed is:

1. An ejector device comprising a base body which comprises the following:
    a suction chamber for sucking in a suction medium;
    a mixing channel for mixing a propelling medium with the suction medium; and
    a drive nozzle device for generating and directing a propelling medium jet along a jet direction from the suction chamber and into the mixing channel,
    wherein the ejector device comprises a fastening device for fastening the base body of the ejector device to a suction channel,
    wherein the fastening device comprises:
        a translational locking device for avoiding a translational movement of the base body relative to the suction channel in a direction running parallel to a center axis of a connecting piece of the suction channel, and
        a rotational locking device for preventing the base body from rotating relative to the suction channel,
    wherein the translational locking device comprises one or more latching devices or is formed by one or more latching devices, and
    wherein the translational locking device and the rotational locking device are spatially separate from one another and wherein the translational locking device and the rotational locking device are actuable consecutively,
    wherein the fastening device is configured in such a way that the base body can initially be slipped onto the connecting piece of the suction channel through a translational movement along a translational direction and can thereby be fixed in a translational orientation relative to the connecting piece and wherein the fastening device is further configured in such a way that the base body can then be rotated about a center axis of the connecting piece by means of the fastening device and can thereby be fixed in a rotational orientation relative to the connecting piece.

2. The ejector device as claimed in claim 1, wherein a suction chamber element of the base body comprises the following components:
    a housing for the suction chamber;
    a suction channel connection;
    a propelling medium connection;
    a drive nozzle element receiver;
    a propelling medium channel for the fluidic connection of the propelling medium connection to the drive nozzle element receiver;
    a flange portion for connecting the suction chamber element to a mixing channel element of the base body that differs therefrom;
    one or more locking elements of the translational locking device of the fastening device for fastening the base body to the suction channel;
    one or more locking elements of the rotational locking device of the fastening device for fastening the base body to the suction channel;
    a positioning device for positioning the suction chamber element relative to the translational locking device and/or relative to the rotational locking device.

3. The ejector device as claimed in claim 1, wherein a mixing channel element of the base body comprises the following components:
    a housing for the mixing channel;
    a discharge connection;
    a flange portion for connecting the mixing channel element to a suction chamber element of the base body that differs therefrom;
    one or more locking elements of the rotational locking device of the fastening device for fastening the base body to the suction channel;
    a positioning device for positioning the mixing channel element relative to the translational locking device and/or relative to the rotational locking device.

4. The ejector device as claimed in claim 1, wherein the fastening device comprises the translational locking device and the rotational locking device, and the translational locking device and the rotational locking device are at least one of:
    a) different from one another,
    b) functionally separate from one another, and
    c) actuable independently of one another.

5. The ejector device as claimed in claim 1, wherein the translational locking device and/or the rotational locking device each comprise one or more locking elements and/or latching receivers.

6. The ejector device as claimed in claim 5, wherein one or more locking elements of the translational locking device and/or of the rotational locking device are configured as projections on a suction chamber element of the base body.

7. The ejector device as claimed in claim 5, wherein one or more locking elements of the translational locking device and/or of the rotational locking device are configured as projections on a mixing channel element of the base body.

8. The ejector device as claimed in claim 5, wherein a locking element of the translational locking device is configured as an annular bead or thickening on an outside of the connecting piece of the suction channel.

9. The ejector device as claimed in claim 5, wherein one or more locking elements of the translational locking device and/or of the rotational locking device are configured as depressions in the connecting piece of the suction channel.

10. The ejector device as claimed in claim 5, wherein one or more locking elements of the translational locking device and/or of the rotational locking device are arranged on a half of a mixing channel element facing away from the suction chamber.

11. A combination of a cylinder head cover and an ejector device as claimed in claim 1.

12. The combination as claimed in claim 11, wherein the cylinder head cover comprises one or more locking elements of the translational locking device and/or one or more locking elements of the rotational locking device which can be brought into engagement for the translational and/or rotational locking of the base body of the ejector device relative to the cylinder head cover with one or more locking elements of the translational locking device and/or the rotational locking device arranged on the base body.

13. The ejector device as claimed in claim 5, wherein one or more locking elements of the rotational locking device are arranged on an end region of a mixing channel element facing away from the suction chamber.

14. A combination of a cylinder head cover and an ejector device,
  wherein a base body of the ejector device comprises the following:
    a suction chamber for sucking in a suction medium;
    a mixing channel for mixing a propelling medium with the suction medium; and
    a drive nozzle device for generating and directing a propelling medium jet along a jet direction from the suction chamber and into the mixing channel,
  wherein the ejector device comprises a fastening device for fastening the base body of the ejector device to a suction channel,
  wherein the fastening device comprises:
    a translational locking device for avoiding a translational movement of the base body relative to the suction channel in a direction running parallel to a center axis of a connecting piece of the suction channel, and
    a rotational locking device for preventing the base body from rotating relative to the suction channel,
    wherein the translational locking device comprises one or more latching devices or is formed by one or more latching devices, and
    wherein the translational locking device and the rotational locking device are spatially separate from one another and wherein the translational locking device and the rotational locking device are actuable consecutively,
  wherein the fastening device is configured in such a way that the base body can initially be slipped onto the connecting piece of the suction channel through a translational movement along a translational direction and can thereby be fixed in a translational orientation relative to the connecting piece and wherein the fastening device is further configured in such a way that the base body can then be rotated about a center axis of the connecting piece by means of the fastening device and can thereby be fixed in a rotational orientation relative to the connecting piece,
  wherein the cylinder head cover comprises the suction channel,
  wherein a locking element of the translational locking device is configured as an annular bead or thickening on an outside of the connecting piece of the suction channel and wherein one or more locking elements of the rotational locking device are configured as depressions in the connecting piece of the suction channel.

15. A combination of a cylinder head cover and an ejector device,
  wherein a base body of the ejector device comprises the following:
    a suction chamber for sucking in a suction medium;
    a mixing channel for mixing a propelling medium with the suction medium; and
    a drive nozzle device for generating and directing a propelling medium jet along a jet direction from the suction chamber and into the mixing channel,
  wherein the ejector device comprises a fastening device for fastening the base body of the ejector device to a suction channel,
  wherein the fastening device comprises:
    a translational locking device for avoiding a translational movement of the base body relative to the suction channel in a direction running parallel to a center axis of a connecting piece of the suction channel, and
    a rotational locking device for preventing the base body from rotating relative to the suction channel,
    wherein the translational locking device comprises one or more latching devices or is formed by one or more latching devices, and
    wherein the translational locking device and the rotational locking device are spatially separate from one another and wherein the translational locking device and the rotational locking device are actuable consecutively,
  wherein the fastening device is configured in such a way that the base body can initially be slipped onto the connecting piece of the suction channel through a translational movement along a translational direction and can thereby be fixed in a translational orientation relative to the connecting piece and wherein the fastening device is further configured in such a way that the base body can then be rotated about a center axis of the connecting piece by means of the fastening device and can thereby be fixed in a rotational orientation relative to the connecting piece,
  wherein the cylinder head cover comprises the suction channel,
  wherein a locking element of the translational locking device is configured as an annular bead or thickening on an outside of the connecting piece of the suction channel and wherein one or more locking elements of the rotational locking device are arranged on a half of a mixing channel element facing away from the suction chamber.

* * * * *